3,133,061
PIPERIDINE CARBOXAMIDES AND
DERIVATIVES THEREOF
Frederick K. Kirchner, Bethlehem, N.Y., assignor to
Sterling Drug Inc., New York, N.Y., a corporation
of Delaware
No Drawing. Filed Nov. 13, 1962, Ser. No. 237,320
30 Claims. (Cl. 260—247.1)

This invention relates to substituted piperidines.

The invention herein claimed resides in the concept of compositions of matter having a molecular structure in which a carbamyl, substituted-carbamyl, thiocarbamyl or substituted-thiocarbamyl group is attached to the nitrogen atom of the piperidine ring of substituted-aminoalkylpiperidines. There is also disclosed processes for physically embodying such concept and the utility inherent in the embodiments so produced.

The substituted-aminoalkylpiperidine moiety of the 1-carbamyl-, 1-substituted-carbamyl-, thiocarbamyl- or 1-substituted-thiocarbamyl-substituted-aminoalkylpiperidines of the invention is not limited as to type or number of substituents, and for operativeness need only carry a hydrogen on the piperidine ring nitrogen prior to conversion to the appropriate 1-carbamyl-, 1-substituted-carbamyl-, thiocarbamyl- or 1-substituted-thiocarbamylpiperidines.

Such compounds contain the nucleus represented by the structural formula

which carries a substituent secondary or tertiary-aminoalkyl group and which may in addition carry other substituents or combinations of substituents on the nucleus in any of the positions not occupied by the substituent secondary or tertiary-aminoalkyl group.

The compounds of the invention can therefore be represented in the broad sense by the generalized formula Y—A—Z wherein Y represents a 1-carbamyl-, 1-substituted-carbamyl-, thiocarbamyl- or 1-substituted-thiocarbamylpiperidyl moiety, A represents an alkylene group having from one to about six carbon atoms and Z represents a secondary or tertiary amino group.

The physical embodiments of inventive concept described herein provides ureas and thioureas in which one nitrogen atom is part of a piperidine ring. Hence the compounds of the invention can be obtained by the use of conventional procedures for the preparation of ureas and thioureas. Thus, the 1-carbamyl-, 1-disubstituted-carbamyl-, 1-substituted-carbamyl-, and 1-substituted-thiocarbamyl-substituted-aminoalkylpiperidines are prepared by reacting an appropriate substituted-aminoalkylpiperidine with (1) an alkali metal cyanate, (2) a disubstituted-carbamoyl halide, (3) an isocyanate, and (4) an isothiocyanate respectively according to the following equations:

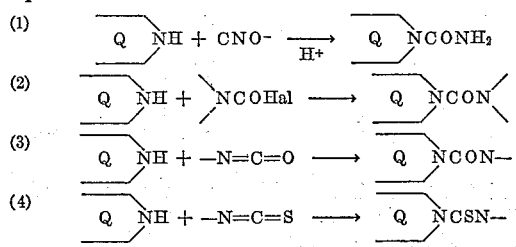

In the above general formulas, Q represents the remaining portion of the piperidine moiety and Hal is a halogen atom.

The reaction depicted in Equation 1 is conveniently carried out at a temperature between about 35° C. and 100° C. in the presence of sufficient acid to liberate cyanic acid. Although the reaction can be carried out at room temperature and in an inert solvent, as for example, benzene, toluene, chloroform and the like, it is preferred to carry out the reaction by heating the reactants in a non-mineral acid, as for example acetic acid. In this case the acetic acid also acts as a solvent for carrying out the reaction. About equimolar amounts of the reactants are used although the amount of alkali metal cyanate can be varied up to about two molar equivalents per molar equivalent of amine.

Alternatively the preparation of the 1-carbamyl compounds can be carried out by heating the amine with urea at a temperature between 120° C. and 160° C., preferably about 150° C. The reaction mixture is heated from three to nine hours and the desired compounds recovered by distillation or crystallization.

The reaction shown in Equation 2 above is carried out in a dry solvent as, for example, benzene, toluene or the like in the presence of an acid-acceptor such as sodium bicarbonate. The reaction takes place at about room temperature and is generally complete in about one hour and the desired products recovered by distillation.

The preparation of the 1-substituted-carbamyl or 1-substituted-thiocarbamylpiperidines according to Equations 3 and 4 above is preferably carried out in a solvent inert under the conditions and to the reagents used in carrying out the reaction and includes lower-alkanols, ethanol, etc. in the case of (3) and benzene, toluene, etc. in the case of (4). The reaction can be carried out by merely mixing the reactants at room temperature. However, it is more practical to carry out the reaction in an inert solvent at a temperature between 50° C. and 75° C., in which case the reaction is usually complete in ten to fifteen minutes. The desired products are recovered by filtration and recrystallization.

A preferred group of compounds comprises those having the structural formula

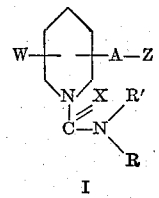

I wherein Z represents a member of the group consisting of monocarbocyclic arylamino, dialkylamino and alkyleneamino and nitrogen or oxygen or sulfur-interrupted alkyleneamino groups, the alkylene portions of which contain four to twelve carbon atoms and which, with the amino nitrogen, form a ring containing four to six carbon atoms, A represents an alkylene radical having from one to about six carbon atoms, X represents a member of the group consisting of oxygen and sulfur, R represents a member of the group consisting of hydrogen, lower-alkyl and lower-alkenyl radicals, and R' represents a member of the group consisting of hydrogen, lower-alkyl, lower-alkenyl, phenyl, benzyl and phenyl and benzyl ring substituted by from one to three members of the group consisting of lower-alkyl, lower-alkoxy, nitro, halogen, and trifluoromethyl and W represents a member of the group consisting of hydrogen and lower-alkyl.

The symbol "Z," when representing a monocarbocyclic arylamino group, stands for unsubstituted anilino or anilino substituted by one or more substituents inert to the reaction conditions and reagents used in the process for preparing the compounds. Such inert substituents include, without limitation, lower-alkyl, lower-alkoxy, lower-alkylmercapto, lower-alkylsulfinyl, lower-alkylsulfonyl, dialkylamino and trifluoromethyl groups.

The symbol "Z," when dialkylamino, stands for an amino group substituted by two lower-alkyl groups which can be the same or different and each of which can contain from one to about six carbon atoms and therefore includes such groups as dimethylamino, diethylamino, methylethylamino, dipropylamino, dibutylamino, diisobutylamino, diamylamino and dihexylamino.

When "Z" represents an alkyleneamino or interrupted alkyleneamino group, the alkylene portions of which contain four to twelve carbon atoms and which with the amino nitrogen form a ring containing four to six carbon atoms, it stands for groups such as 1-pyrrolidyl, 1-piperidyl, 2,5-dimethyl-1-pyrrolidyl, 1-hexamethyleniminyl, 5-ethyl-1-piperidyl, 4-butyl-2-methyl-1-piperidyl etc. for alkyleneamino and 4-morpholinyl, 2,6-diethyl-4-morpholinyl, 1-piperazinyl, 4-ethyl-1-piperazinyl, 4-phenyl-1-piperazinyl, 4-thiomorpholinyl, 3-thiazolidinyl, 3 - hexahydrothiazepinyl, 3-azabicyclo[3.2.2]nonane and the like for interrupted alkyleneamino groups.

The "A" in the above Formula I represents a divalent alkylene radical having from one to about six carbon atoms and hence includes for example, methylene, —CH$_2$—, ethylene, —CH$_2$CH$_2$—, 1,3-propylene,
—CH$_2$CH$_2$CH$_2$—, 1,2-propylene,
—CH(CH$_3$)CH$_2$—, 1,4-butylene,
—CH$_2$CH$_2$CH$_2$CH$_2$—, 1,2-dimethyl-ethylene,
—CH(CH$_3$)CH(CH$_3$)—, 1,5-pentylene,
—CH$_2$CH$_2$CH$_2$CH$_2$CH$_2$—, 1-ethyl-2-methylethylene,
—CH(C$_2$H$_5$)CH(CH$_3$)—, 1,6-hexylene,
—CH$_2$CH$_2$CH$_2$CH$_2$CH$_2$CH$_2$—, and the like.

When R and R' in the above Formula I represent a lower-alkyl or lower-alkenyl group they stand, in the case of lower-alkyl, for groups having from one to about six carbon atoms and thus including for example, radicals such as methyl, ethyl, propyl, isopropyl, butyl, isobutyl, amyl, isoamyl, hexyl, isohexyl etc., and when lower-alkenyl for groups such as allyl, 1-butenyl, 2-butenyl, 1-pentenyl, 3-pentenyl, 1-hexenyl and the like.

When R' in the above Formula I represents phenyl or benzyl substituted by from one to three substituents selected from lower-alkyl, lower-alkoxy, nitro, halogen and trifluoromethyl groups, the lower-alkyl and lower-alkoxy groups have from one to about six carbon atoms, thus including such radicals as methyl, ethyl, propyl, isopropyl, butyl, isobutyl, amyl, isohexyl etc. for lower-alkyl and methoxy, ethoxy, propoxy, butoxy, isobutoxy, pentoxy, isopentoxy, hexoxy, isohexoxy and the like for lower-alkoxy and the halogen substituent can be any of the halogens, i.e., fluorine, chlorine, bromine, iodine.

The W in the above Formula I represents hydrogen or a lower-alkyl group having from one to about six carbon atoms thus including such radicals as methyl, ethyl, propyl, isopropyl, butyl, isobutyl, amyl, isohexyl, etc.

Another preferred aspect of the invention relates to compounds having the formula

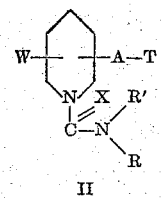

II wherein A, W, X, R and R' have the meanings given above and T is a member of the group consisting of di-lower-alkylamino, 1-pyrrolidyl, lower-alkylated - 1-pyrrolidyl, 1-piperidyl, lower-alkylated-1-piperidyl, 4-morpholinyl, lower-alkylated-4-morpholinyl, 4-thiomorpholinyl, 1-hexamethyleniminyl, 2-(1,2,3,4-tetrahydroisoquinolyl), 4-phenyl-1-piperazinyl, 4-lower-alkyl-1-piperazinyl, 4-(2-hydroxyethyl)-1-piperazinyl, anilino and anilino substituted by from one to three members of the group consisting of lower-alkyl and lower-alkoxy groups.

A particularly preferred aspect of the invention relates to compounds having the formulas

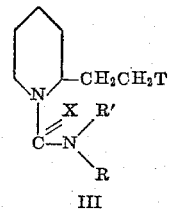

III and

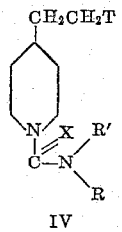

IV wherein X, R, R' and T have the meanings given above because of the ease of preparation and ready availability of the intermediates as will be seen hereinafter.

In the above general Formulas III and IV, when T stands for lower-alkylated-1-pyrrolidyl, 1-piperidyl, 4-morpholinyl or 4-lower-alkyl-1-piperazinyl groups it represents such rings substituted at any of the available positions by one to two lower-alkyl groups having from one to about six carbon atoms such as methyl, ethyl, propyl, isopropyl, butyl, isobutyl, amyl, isoamyl, hexyl and the like.

The intermediate substituted-aminoalkylpiperidines are members of a known class of compounds but certain subgenera and individual members have not been characterized hitherto. The intermediates are prepared by hydrogenation of the reaction product resulting from the condensation of 2- and 4-vinylpyridines with amines.

The substituted-aminoalkylpyridines used in the preparation of the substituted-aminoalkylpiperidines are likewise a known class of compounds certain subgenera and individual members of which have hitherto not been disclosed or characterized. These 2-[2-(4-phenyl-1-piperazinyl)ethyl]pyridines are disclosed and claimed in my copending application Serial No. 237,321 filed November 13, 1962.

The intermediates for the preparation of the compounds of Formulas III and IV as well as those represented by Formula I can be prepared by a number of methods known to those skilled in the art. Thus, the condensation of 2- or 4-methylpyridines with substituted-aminoalkyl halides in the presence of sodamide followed by reduction of the pyridine ring leads to compounds wherein the alkylene bridge is varied:

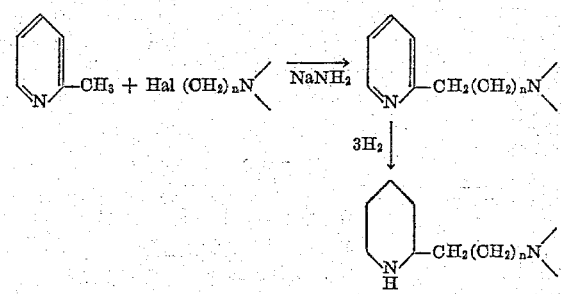

Alternatively, the amides resulting from the condensation of ω-pyridylalkanoic acid esters with amines or the ketones from the Claisen condensation between pyridylcarboxylic acid esters and ω-substituted-aminoalkanoic acid esters can be reduced with, for example, lithium aluminum hydride according to the following illustrative equations:

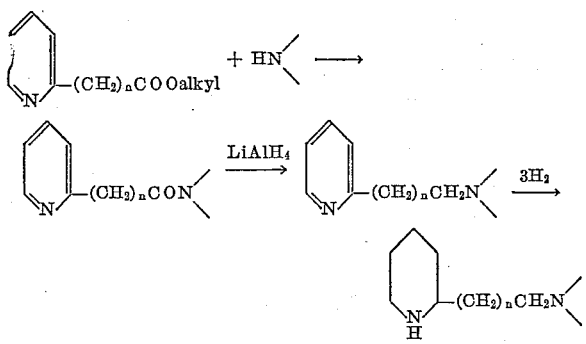

or

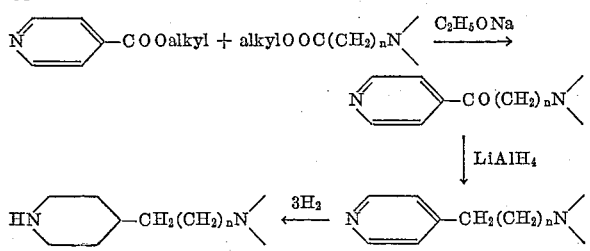

As a specific example, the application of the above syntheses to the preparation of 3-[3-(1-pyrrolidyl)propyl] piperidine is given below:

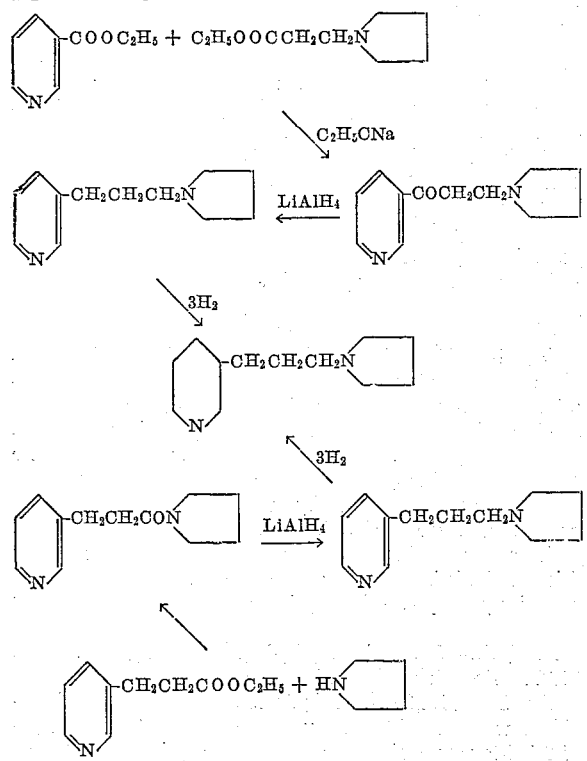

The acid-addition salts and the quaternary ammonium salts of the bases herein described are the form in which the bases are most conveniently prepared for use and are the full equivalents of the subject matter specifically claimed. The preferred type of salts are water-soluble pharmacologically acceptable salts, that is, salts whose anions are innocuous to animal organisms in therapeutic doses of the salts, so that the beneficial physiological properties inherent in the free bases are not vitiated by side effects ascribable to the anions; in other words, the latter do not substantially increase the toxicity inherent in the cations. Appropriate acid-addition salts are those derived from mineral acids such as hydrochloric acid, hydrobromic acid, hydriodic acid, nitric acid, sulfuric acid, and phosphoric acid; and organic acids such as acetic acid, citric acid, lactic acid, tartaric acid, ethanesulfonic acid, and quinic acid. The quaternary ammonium salts are obtained by the addition of esters of strong acids to the free base form of the compounds, said esters having a molecular weight less than about 200. A preferred class of esters comprises alkyl, alkenyl, and monocarbocyclic aryl-lower-alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, p-methoxybenzyl chloride, o-chlorobenzyl chloride, and the like.

The acid-addition salts are prepared either by dissolving the free base in an aqueous solution containing the appropriate acid, and isolating the salt by evaporating the solution, or by reacting the free base and acid in an organic solvent, in which case the salt separates directly or can be obtained by concentration of the solution.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

It is also possible to convert one quaternary ammonium salt to another in which the anion is different. If the anion of the original quaternary salt forms a water-insoluble silver salt, the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid can be obtained.

Although therapeutically acceptable salts are preferred, those having toxic anions are also useful when employed as intermediates in the purification of the free base and in conversion to other salts, and as characterizing derivatives of the free bases.

Thus it will be appreciated the acid moieties or anions which can be associated in the salt forms are in themselves neither novel nor critical and therefore can be any acid anion or acid-like substance capable of salt formation with bases.

The structures of the compounds of the invention are established by the mode of their preparation and by chemical analysis establishing the percentage composition of carbon, hydrogen and nitrogen.

The following will further illustrate the invention, without the latter being limited thereto.

*Example 1*

(a) 2-(2-anilinoethyl)piperidine dihydrochloride: A solution of 79 g. of 2-(2-anilinoethyl)pyridine in 300 cc. of glacial acetic acid was hydrogenated over Adams catalyst at room temperature for a period of six and one-half hours. The catalyst was removed by filtration and the solution made basic with 35% sodium hydroxide. The oil which separated was taken up in benzene and the benzene extract dried over anhydrous calcium sulfate. Addition of ethereal hydrochloric acid caused the separation of a gum-like dihydrochloride which was boiled in anhydrous ethanol after the benzene was decanted. The resultant white solid was recrystallized from anhydrous ethanol to give 73 g. of 2-(2-anilinoethyl)piperidine dihydrochloride, M.P. 219–222° C. (corr.).

*Analysis.*—Calcd. for $C_{13}H_{22}Cl_2N_2$: N, 10.11; Cl, 25.57. Found: N, 10.09; Cl. 25.40.

The above dihydrochloride was dissolved in water and the solution made basic with ammonium hydroxide. The oily crystals which precipitated were dissolved in benzene, the benzene solution concentrated then triturated with n-pentane. After the white solid which separated was recrystallized several times from an ethanol-water mixture there was obtained 2-(2-anilinoethyl)piperidine, M.P. 50–52° C. (corr.).

*Analysis.*—Calcd. for $C_{13}H_{20}N_2$: C, 76.42; H, 9.87; N, 13.71. Found: C, 76.37; H, 10.14; N, 13.86.

(b) 1-carbamyl-2-(2-anilinoethyl)piperidine: A mixture of 5.1 g. of 2-(2-anilinoethyl)piperidine and 2.25 g. of potassium cyanate in 25 cc. of glacial acetic acid was heated for one hour on a steam bath. The solution was poured into 200 cc. of water and the resultant solution made basic with sodium hydroxide. The mixture was extracted four times with chloroform and the chloroform extracts dried over calcium sulfate. After removal of the chloroform by distillation under diminished pressure, the residual gum was taken up in benzene and left standing for forty-eight hours. The solid which separated was collected by suction filtration and dried and there was thus obtained 2.4 g. of 1-carbamyl-2-(2-anilinoethyl)piperidine, M.P. 120–127° C. (corr.).

*Analysis.*—Calcd. for $C_{14}H_{21}N_3O$: C, 67.98; H, 8.56; N, 16.99. Found: C, 67.89; H, 8.65; N, 16.73.

The minimum effective hypotensive dose (MEHD) of 1-carbamyl-2-(2-anilinoethyl)piperidine given subcutaneously in the renal hypertensive rat was found to be 0.01 mg./kg. The hypotensive effect lasted for forty-eight hours and the maximum drop in blood pressure was reached in two hours.

*Example 2*

(a) 2-[2-(1-pyrrolidyl)ethyl]piperidine was prepared by the hydrogenation of 264 g. of 2-[2-(1-pyrrolidyl)ethyl]pyridine in 750 cc. of glacial acetic acid using the manipulative procedure described above in Example 1(a). The oil which separated was distilled under vacuum to give 186 g. of 2-[2-(1-pyrrolidyl)ethyl]piperidine, B.P. 80.0° C./0.2 mm.

*Analysis.*—Calcd. for $C_{11}H_{22}N_2$: C, 72.87; H, 12.17; N, 15.37. Found: C, 72.36; H, 12.09; N, 15.16.

(b) 1-carbamyl - 2 - [2-(1-pyrrolidyl)ethyl]piperidine was prepared from 21.9 g. of 2-[2-(1-pyrrolidyl)ethyl]piperidine and 9.75 g. of potassium cyanate in 75 cc. of glacial acetic acid using the procedure described above in Example 1(b). After recrystallization from n-hexane there was obtained 8.9 g. of 1-carbamyl-2-[2-(1-pyrrolidyl)ethyl]piperidine, M.P. 107–109° C. (corr.).

*Analysis.*—Calcd. for $C_{12}H_{23}N_3O$: C, 63.96; H, 10.29; N, 18.65. Found: C, 64.26; H, 10.28; N, 18.40.

(c) 1-carbamyl - 2 - [2-(1-pyrrolidyl)ethyl]piperidine methiodide was prepared by refluxing 11.25 g. of 1-carbamyl-2-[2-(1-pyrrolidyl)ethyl]piperidine with 5 g. of methyl iodide in 100 ml. of methanol for two hours. Trituration of the reaction mixture with ether gave 12.5 g. of 1-carbamyl-2-[2-(1-pyrrolidyl)ethyl[piperidine, M.P. 170–171° C. (corr.).

*Analysis.*—Calcd. for $C_{13}H_{26}IN_3O$: I, 34.56; N, 11.44. Found: I, 35.06; N, 11.23.

(d) 1-carbamyl - 2 - [2-(1-pyrrolidyl)ethyl]piperidine methyl p-toluenesulfonate was prepared by mixing 5.63 g. of 1-carbamyl - 2 - [2-(1-pyrrolidyl)ethyl]piperidine with 4.65 g. of methyl p-toluenesulfonate in 50 ml. of dry benzene and allowing the mixture to stand overnight at room temperature. The benzene was removed by heating on a steam bath and the residue taken in absolute ethanol. Trituration with anhydrous ether gave a finely divided solid which was collected by filtration. After drying overnight in a vacuum desiccator there was obtained 5.62 g. of 1-carbamyl-2-[2-(1-pyrrolidyl)ethyl]piperidine methyl p-toluenesulfonate, M.P. 160–162° C. (corr.).

*Analysis.*—Calcd. for $C_{20}H_{33}N_3O_4S$: N, 10.21; S, 7.79. Found: N, 10.10; S, 7.85.

The MEHD of 1-carbamyl-2-[2-(1-pyrrolidyl)ethyl]piperidine given subcutaneously and orally in the renal hypertensive rat was found to be 0.01 mg./kg. The hypotensive effect lasted for forty-eight and seventy-two hours respectively on subcutaneous and oral administration, and the maximum drop in blood pressure on subcutaneous and oral administration was reached in four and six hours respectively. 1-carbamyl - 2 - [2-(1-pyrrolidyl)ethyl]piperidine produced an average fall in both systolic and diastolic blood pressure of fifteen percent below the control in trained unanesthetized normotensive dogs at a dose of 1.0 mg./kg. intravenously. There was no alternation of the heart rate of the dogs nor were there any indications of side effects such as sedation, diarrhea or panting. Acute intravenous toxicity determinations in mice and dogs indicate that 1-carbamyl-2-[2-(1-pyrrolidyl)ethyl] piperidine has $ALD_{50}$'s of $160 \pm 13.0$ mg./kg. and $>50$, $<200$ mg./kg. respectively (approximate lethal dose in 50% of the animals). Acute oral toxicity determinations in mice indicate that the $LD_{50}$ is 3000 mg./kg.

*Example 3*

(a) 4-(2-anilinoethyl)piperidine: A mixture of 30 g. of 4-(2-anilinoethyl)pyridine and 750 cc. of anhydrous ethanol was heated to reflux then treated with 100 g. of sodium, added over one hour. The mixture was refluxed for one hour then the solution was decanted from a black solid which separated. Water was added to the supernatant to cause the separation of two phases which were extracted with benzene. The benzene extracts were dried over anhydrous sodium sulfate and the benzene removed by distillation under diminished pressure. The brown residue which remained was recrystallized several times from n-hexane to give 11.2 g. of 4-(2-anilinoethyl)piperidine, M.P. 92–94° C. (corr.).

*Analysis.*—Calcd. for $C_{13}H_{20}N_2$: C, 76.42; H, 9.87; N, 13.71. Found: C, 76.22; H, 9.53; N, 13.75.

(b) 1-carbamyl - 2 - (2-anilinoethyl)piperidine can be prepared by heating 4-(2-anilinoethyl)piperidine with potassium cyanate using the manipulative procedure described above in Example 1(b).

*Example 4*

(a) 2-[2-(1,2,3,4 - tetrahydroisoquinolyl-2)ethyl]pyridine: To a solution of 100 g. of 1,2,3,4-tetrahydroisoquinoline in 400 cc. of dry methanol and 43 cc. of glacial acetic acid was added while heating and stirring 78.8 g. of 2-vinylpyridine. When the addition was complete heating and stirring was continued for five hours. The solution was concentrated by evaporation and the residue poured onto ice and the aqueous mixture made basic with sodium hydroxide. The oil which separated was dried and distilled to give 103 g. of 2-[2-(1,2,3,4-tetrahydroisoquinolyl-2)ethyl]pyridine, B.P. 150–153° C./0.28 mm.

*Analysis.*—Calcd. for $C_{16}H_{18}N_2$: C, 80.63; H, 7.61; N, 11.76. Found: C, 80.91; H, 7.85; N, 11.69.

(b) 2-[2-(1,2,3,4 - tetrahydoisoquinolyl-2)ethyl]piperidine was prepared by hydrogenation of 95.3 g. of 2-[2-(1,2,3,4-tetrahydroisoquinolyl-2)ethyl]pyridine in 300 cc. of glacial acetic acid using the manipulative procedure described above in Example 1(a). The red oil was extracted with ether, and the ether extracts dried over potassium carbonate. After the ether was removed by evaporation under diminished pressure the residual oil was distilled to give 77 g. of 2-[2-(1,2,3,4-tetrahydroisoquinolyl-2)ethyl]piperidine, B.P. 145–147° C./0.25 mm.

*Analysis.*—Calcd. for $C_{16}H_{24}N_2$: C, 78.63; H, 9.90; N, 11.47. Found: C, 78.92; H, 9.75; N, 11.35.

(c) 1-carbamyl-2-[2-(1,2,3,4-tetrahydroisoquinolyl-2)-ethyl]piperidine was prepared from 24.4 g. of 2-[2-(1,2,3,4-tetrahydroisoquinolyl-2)ethyl]piperidine and 16.4 g. of potassium cyanate in 75 cc. of glacial acetic acid following the manipulative procedure described above in Example 1(b). The white solid remaining after the basic solution was extracted with ether was taken up in chloroform and n-pentane added. After standing overnight at room temperature white crystals separated. The crystals were removed by filtration, recrystallized from a chloroform-n-pentane mixture and dried. There was thus obtained 8.8 g. of 1-carbamyl-2-[2-(1,2,3,4-tetrahydroisoquinolyl-2)ethyl]piperidine, M.P. 126–129° C. (corr.).

Analysis.—Calcd. for $C_{17}H_{25}N_3O$: C, 71.04; H, 8.77; N, 14.62. Found: C, 71.27; H, 8.81; N, 14.44.

The MEHD of 1-carbamyl-2-[2-(1,2,3,4-tetrahydroisoquinolyl-2)ethyl]piperidine given subcutaneously in the renal hypertensive rat was found to be 0.10 mg./kg. The acute intravenous toxicity in the mouse was found to be 60 mg./kg.

Example 5

1-carbamyl-2-[2-(1-piperidyl)ethyl]piperidine was prepared from 19.5 g. of 2-[2-(1-piperidyl)ethyl]piperidine and 8.2 g. of potassium cyanate in 75 cc. of glacial acetic acid using the manipulative procedure described above in Example 1(b). The liquid remaining after removal of the chloroform solidified on standing and the solid thus obtained was collected by filtration. The white solid was taken up in hot n-hexane and the solution cooled in an ice bath. The solid which separated was collected and dried to give 6.2 g. of 1-carbamyl-2-[2-(1-piperidyl)ethyl]piperidine, M.P. 120–127° C. (corr.).

Analysis.—Calcd. for $C_{13}H_{25}N_3O$: C, 65.23; H, 10.53; N, 17.56. Found: C, 65.46; H, 10.28; N, 17.39.

Example 6

1-carbamyl-4-[2-(1-piperidyl)ethyl]piperidine was prepared from 19.5 g. of 4-[2-(1-piperidyl)ethyl]piperidine and 8.2 g. of potassium cyanate in 75 cc. of glacial acetic acid using the manipulative procedure described above in Example 1(b). The residue remaining after removal of the chloroform was taken up in n-pentane and left standing. The solid which separated was collected by filtration, recrystallized from a chloroform-n-pentane mixture, and dried. There was thus obtained 6.6 g. of 1-carbamyl-4-[2-(1-piperidyl)ethyl]piperidine, M.P. 144–146° C. (corr.).

Analysis.—Calcd. for $C_{13}H_{25}N_3O$: C, 65.23; H, 10.53; N, 17.56. Found: C, 65.23; H, 10.60; N, 17.45.

The MEHD of 1-carbamyl-4-[2-(1-piperidyl)ethyl]piperidine given subcutaneously in the renal hypertensive rat was found to be >0.10 mg./kg. The acute intravenous toxicity in the mouse was found to be 170 mg./kg.

Example 7

1-carbamyl-5-ethyl-2-[2-(1-piperidyl)ethyl]piperidine was prepared from 22.2 g. of 5-ethyl-2-[2-(1-piperidyl)ethyl]piperidine and 16.2 g. of potassium cyanate in 75 cc. of glacial acetic acid using the manipulative procedure described above in Example 1(b). The basic solution was extracted with ether and the ether extracts dried over calcium sulfate. The combined ether extracts were distilled under reduced pressure to remove the ether and the solid residue collected by filtration. Recrystallization from n-hexane gave 8.9 g. of 1-carbamyl-5-ethyl-2-[2-(1-piperidyl)ethyl]piperidine, M.P. 109–116° C. (corr.).

Analysis.—Calcd. for $C_{15}H_{29}N_3O$: C, 67.37; H, 10.93; N, 15.71. Found: C, 67.22; H, 11.17; N, 15.61.

The MEHD of 1-carbamyl-5-ethyl-2-[2-(1-piperidyl)ethyl]piperidine given subcutaneously in the renal hypertensive rat was found to be 0.10 mg./kg. The acute intravenous toxicity in the mouse was found to be 60 mg./kg.

Example 8

1-carbamyl-4-[2-(1-pyrrolyidyl)ethyl]piperidine was prepared from 18.1 g. of 4-[2-(1-pyrrolidyl)ethyl]piperidine and 8.2 g. of potassium cyanate in 75 cc. of glacial acetic acid using the manipulative procedure described above in Example 1(b). After recrystallization from a chloroform-n-hexane mixture there was obtained 1.9 g. of 1-carbamyl-4-[2-(1-pyrrolidyl)ether]piperidine, M.P. 125.6–126° C. (corr.)

Analysis.—Calcd. for $C_{12}H_{23}N_3O$: C, 63.96; H, 10.29; N, 18.65. Found: C, 64.20; H, 10.03; N, 18.51.

The MEHD of 1-carbamyl-4-[2-(1-pyrrolidyl)ethyl]piperidine given subcutaneously in the renal hypertensive rat was found to be 0.10 mg./kg. The acute intravenous toxicity in the mouse was found to be 175 mg./kg.

Example 9

(a) 2-[2-(4-phenyl-1-piperazinyl)ethyl]pyridine was prepared from 81 g. of 1-phenylpiperazine and 52.5 g. of 2-vinylpyridine in 250 cc. of anhydrous methanol and 28.6 cc. of glacial acetic acid using the procedure described above in Example 4(a). After recrystallization from n-hexane there was obtained 14.2 g. of 2-[2-(4-phenyl-1-piperazinyl)ethyl]pyridine, M.P. 60–61° C. (corr.).

Analysis.—Calcd. for $C_{17}H_{21}N_3$: C, 76.37; H, 7.92; N, 15.72. Found: C, 76.38; H, 7.75; N, 15.67.

(b) 2-[2-(4-phenyl-1-piperazinyl)ethyl]piperidine was prepared by hydrogenation of 169 g. of 2-[2-(4-phenyl-1-piperazinyl)ethyl]pyridine in 450 cc. of glacial acetic acid using the procedure described above in Example 1(a). Recrystallization from n-hexane gave 69 g. of 2-[2-(4-phenyl-1-piperazinyl)ethyl]piperidine, M.P. 52–56° C. (corr.).

Analysis.—Calcd. for $C_{17}H_{27}N_3$: N, 15.37. Found: N, 15.11.

(c) 1-carbamyl-2-[2-(4-phenyl-1-piperazinyl)ethyl]piperidine was prepared from 19.9 g. of 2-[2-(4-phenyl-1-piperazinyl)ethyl]piperidine and 11.8 g. of potassium cyanate in 75 cc. of glacial acetic acid using the manipulative procedure described above in Example 1(b). The addition of sodium hydroxide caused the separation of a pink solid which was collected by filtration. After two recrystallizations from ethanol there was obtained 9.1 g. of 1-carbamyl-2-[2-(4-phenyl-1-piperazinyl)ethyl]piperidine, M.P. 188–190° C. (corr.).

Analysis.—Calcd. for $C_{18}H_{28}N_4O$: C, 68.32; H, 8.92; N, 17.71. Found: C, 68.62; H, 8.83; N, 17.60.

The MEHD of 1-carbamyl-2-[2-(4-phenyl-1-piperazinyl)ethyl]piperidine given subcutaneously in the renal hypertensive rat was found to be 0.01 mg./kg. The acute intravenous toxicity in the mouse was found to be 60 mg./kg.

Example 10

1-carbamyl-2-[2-(4-morpholinyl)ethyl]piperidine: A mixture of 19.7 g. of 2-[2-(4-morpholinyl)ethyl]piperidine and 3 g. of urea was heated at 120° C. for five hours with stirring. The mixture was cooled to room temperature, n-hexane added to cause the separation of a white solid. The solid was collected by filtration and recrystallized twice from ethyl acetate. There was thus obtained 9.5 g. of 1-carbamyl-2-[2-(4-morpholinyl)ethyl]piperidine, M.P. 130–133° C. (corr.).

Analysis.—Calcd. for $C_{12}H_{23}N_3O_2$: $N_{total}$, 17.41; $N_{amino}$, 5.81. Found: $N_{total}$, 18.27; $N_{amino}$, 5.67.

The MEHD of 1-carbamyl-2-[2-(4-morpholinyl)ethyl]piperidine given subcutaneously in the renal hypertensive rat was found to be 0.01 mg./kg. The acute intravenous toxicity in the mouse was found to be 875 mg./kg.

Example 11

(a) 4-[2-(1-hexamethyleniminyl)ethyl]pyridine was prepared from 99.2 g. of hexamethyleneimine and 105 g. of 4-vinylpyridine in 400 cc. of anhydrous methanol and 57.2 cc. of glacial acetic acid using the manipulative procedure described above in Example 4(a). After distillation there was thus obtained 120 g. of 4-[2-(1-hexamethyleniminyl)ethyl]pyridine, B.P. 118–121° C./0.25 mm.

*Analysis.*—Calcd. for $C_{13}H_{26}N_2$: C, 76.42; H, 9.87; N, 13.71. Found: C, 76.51; H, 10.05; N, 13.64.

(b) 4-[2-(1-hexamethyleniminyl)ethyl]piperidine was prepared by hydrogenation of 140.8 g. of 4-[2-(1-hexamethyleniminyl)ethyl]pyridine in 520 cc. of glacial acetic acid using the manipulative procedure described above in Example 1(a). The oil which separated was taken up in ether and the ether extracts dried. Concentration of the solution under reduced pressure followed by distillation of the residual oil gave 114 g. of 4-[2-(1-hexamethyleniminyl)ethyl]piperidine, B.P. 121–131° C./1.0 mm.

*Analysis.*—Calcd. for $C_{13}H_{26}N_2$: C, 74.22; H, 12.46; N, 13.32. Found: C, 75.05; H, 12.24; N, 13.09.

(c) 1 - carbamyl - 4-[2 - (1-hexamethyleniminyl)ethyl] piperidine can be prepared by heating 4-[2-(1-hexamethyleniminyl)ethyl]piperidine with potassium cyanate using the manipualtive procedure described above in Example 1(b).

Example 12

(a) 2-[2-(1-hexamethyleniminyl)ethyl]piperidine was prepared by hydrogenation of 107.3 g. of 2-[2-(1-hexamethyleneiminyl)ethyl]pyridine in 400 cc. of glacial acetic acid using the manipulative procedure described above in Example 1(a). The oil which separated was taken up in ether and the aqueous layer extracted with additional ether. The combined ether extracts were dried and the ether removed by evaporation under reduced pressure. Distillation of the residual oil gave 34.4 g. of 2-[2-(1-hexamethyleniminyl)ethyl]piperidine, B.P. 103–105° C./0.8 mm.

*Analysis.*—Calcd. for $C_{13}H_{26}N_2$: C, 74.22; H, 12.46; N, 13.32. Found: C, 73.89; H, 12.12; N, 13.26

(b) 1 - carbamyl - 2-[2-(1-hexamethyleniminyl)ethyl] piperidine can be prepared by heating 2-[2-(1-hexamethyleniminyl)ethyl]piperidine with potassium cyanate using the manipulative procedure described above in Example 1(b).

Example 13

1 - carbamyl - 2-[2-(2,6-dimethyl-4-morpholinyl)ethyl] piperidine was prepared from 22.6 g. of 2-[2-(2,6-dimethyl-4-morpholinyl)ethyl]piperidine and 16.2 g. of potassium cyanate in 75 ml. of glacial acetic acid using the manipulative procedure described above in Example 1(b). After recrystallization from ethyl acetate there was obtained 4.4 g. of 1-carbamyl-2-[2-(2,6-dimethyl-4-morpholinyl)ethyl]piperidine, M.P. 111–113° C. (corr.).

*Analysis.*—Calcd. for $C_{14}H_{27}N_3O_2$: C, 62.42; H, 10.10; N, 15.60. Found: C, 62.36; H, 10.01; N, 15.55.

Example 14

1-carbamyl-2-[2-(4-methyl-1-piperidyl)ethyl]piperidine was prepared from 21 g. of 2-[2-(4-methyl-1-piperidyl) ethyl]piperidine and 16.2 g. of potassium cyanate in 75 ml. of glacial acetic acid using the manipulative procedure described above in Example 1(b). After recrystallization from n-hexane there was obtained 7.2 g. of 1-carbamyl-2-[2-(4-methyl-1-piperidyl)ethyl]piperidine, M.P. 90–93° C. (corr.).

*Analysis.*—Calcd. for $C_{14}H_{27}N_3O$: C, 66.36; H, 10.74; N, 16.58. Found: C, 66.33; H, 10.68; N, 16.77.

Example 15

1-carbamyl-2-(2-diethylaminoethyl)piperidine can be prepared by heating 18.4 g. of 2-(2-diethylaminoethyl)piperidine with 16.2 g. of potassium cyanate in 75 ml. of glacial acetic acid using the manipulative procedure described above in Example 1(b).

Example 16

1 - carbamyl - 2 - [2 - (2 - methoxyanilino)ethyl]piperidine was prepared by heating 23.4 g. of 2-[2-(2-methoxyanilino)ethyl]piperidine with 16.2 g. of potassium cyanate in 75 ml. of glacial acetic acid using the manipulative procedure described above in Example 1(b). The 3 g. of 1-carbamyl-2-[2-(2-methoxyanilino)ethyl]piperidine thus obtained had the M.P. 148–150° C.

Example 17

1 - carbamyl - 2 - (2 - dihexylaminoethyl)piperidine can be prepared by heating 29.6 g. of 2-(2-dihexylaminoethyl)piperidine with 16.2 g. of potassium cyanate in 75 ml. of glacial acetic acid using the manipulative procedure described above in Example 1(b).

Example 18

1 - carbamyl - 4 - [2 - (4 - methyl - 1 - piperazinyl)ethyl]piperidine can be prepared by heating 21.1 g. of 2-[4-(4-methyl-1-piperazinyl)ethyl]piperidine with 16.2 g. of potassium cyanate in 75 ml. of glacial acetic acid using the procedure described above in Example 1(b).

Example 19

1 - carbamyl - 2 - [2 - (2,6 - dimethylanilino)ethyl]piperidine can be prepared by heating 23.3 g. of 2-[2,6-dimethylanilino)ethyl]piperidine, prepared by hydrogenation of 2-[2-(2,6-dimethylanilino)ethyl]pyridine, with 16.2 g. of potassium cyanate following the procedure described above in Example 1(b). The 2-[2-(2,6-dimethylanilino)ethyl]pyridine in turn can be prepared by condensing 2-vinylpyridine with 2,6-dimethylaniline.

Example 20

1 - carbamyl - 4 - [2 - (2,5 - diethyl - 1 - pyrrolidyl)ethyl]piperidine can be prepared by the condensation of 4-vinylpyridine with 2,5-diethylpyrrolidine to form 4-[2-(2,5-diethyl-1-pyrrolidyl)ethyl]pyridine, reduction to 4-[2-(2,5-diethyl-1-pyrrolidyl)ethyl]piperidine and heating of the latter with potassium cyanate.

Example 21

1 - carbamyl - 4 - (2 - di - n - butylaminoethyl)piperidine hydrobromide can be prepared by heating 4-(2-di-n-butylaminoethyl)piperidine with potassium cyanate using the procedure described above in Example 1(b) followed by treatment of the base thus obtained with ethereal hydrogen bromide.

Example 22

1 - carbamyl - 2 - [2 - (4 - isopropylanilino)ethyl]piperidine ethane sulfonate can be prepared by heating 2-[2-(4-isopropylanilino)ethyl]piperidine with potassium cyanate followed by treatment of the anhydrous 1-carbamyl-2-[2-(4-isopropylanilino)ethyl]piperidine with ethane sulfonic acid. The 2-[2-(4-isopropylanilino)ethyl]piperidine can be prepared by hydrogenation of 2-[2-(4-isopropylanilino)ethyl]pyridine prepared by condensation of 2-vinylpyridine with 4-isopropylaniline.

Example 23

1 - carbamyl - 4 - [2 - (3,4,5 - trimethoxyanilino)ethyl]piperidine can be prepared by the condensation of 4-vinylpyridine with 3,4,5-trimethoxyaniline, hydrogenation to the corresponding 4-[2-(3,4,5-trimethoxyanilino)ethyl]piperidine and heating of the latter with potassium cyanate.

Example 24

1 - carbamyl - 2 - [2 - (4 - thiomorpholinyl)ethyl]piperidine can be prepared by the condensation of thiomorpholine with 2-vinylpyridine to form 2-[2-(4-thiomorpholinyl)ethyl]pyridine, reduction to the corresponding 2-[2-(4-thiomorpholinyl)ethyl]piperidine and heating of the latter with potassium cyanate.

Example 25

1 - phenylcarbamyl - 2 - [1 - (pyrrolidyl)ethyl]piperidine: A solution of 9 g. of 2-[1-(pyrrolidyl)ethyl]piperidine in 50 ml. of dry benzene was treated with 6 g. of phenyl isocyanate and the mixture heated for ten minutes. Dilution of the reaction mixture with n-hexane caused the separation of a solid which was collected by suction filtration. There was thus obtained 13.6 g. of 1-phenylcarbamyl - 2 - [1 - (pyrrolidyl)ethyl]piperidine, M.P. 137–138° C. (corr.).

Analysis.—Calcd. for $C_{18}H_{27}N_3O$: C, 61.72; H, 9.03; N, 13.94. Found: C, 71.53; H, 8.78; N, 13.84.

The MEHD of 1-phenylcarbamyl-2-[1-(pyrrolidyl)-ethyl]piperidine given subcutaneously in the renal hypertensive rat was found to be 0.01 mg./kg.

Example 26

1 - phenylthiocarbamyl - 2 - [2 - (1 - pyrrolidyl)ethyl]-piperidine: A mixture of 9.1 g. of 2-[2-(1-pyrrolidyl)-ethyl]piperidine and 7 g. of phenylisothiocyanate was refluxed for five minutes. The solid which precipitated was collected by filtration and recrystallized from ethanol to give 13 g. of 1-phenylthiocarbamyl-2-[2-(1-pyrrolidyl)-ethyl]piperidine, M.P. 129–130° C. (corr.).

Analysis.—Calcd. for $C_{18}H_{27}N_3S$: N, 13.24; S, 10.10. Found: N, 12.98; S, 10.20.

Example 27

1 - (4 - chlorophenylthiocarbamyl) - 2 - [2 - (1 - piperidyl)ethyl]piperidine: To a solution of 9.75 g. of 2-[2-(1-piperidyl)ethyl]piperidine in 50 ml. of absolute ethanol was added 8.5 g. of 4-chlorophenylisothiocyanate in 30 ml. of absolute ethanol. The solution was warmed on a steam bath for ten minutes then cooled. The white solid which separated was collected and dried. There was thus obtained 14.4 g. of 1-(4-chlorophenylthiocarbamyl) - 2 - [2 - (1 - piperidyl)ethyl]piperidine, M.P. 151–154° C. (corr.).

Analysis.—Calcd. for $C_{19}H_{28}ClN_3S$: Cl, 9.69; N, 11.48. Found: Cl, 10.03; N, 11.46.

When administered orally to rats infected with the roundworm Strongyloides ratti, 1-(4-chlorophenylthiocarbamyl) - 2 - [2 - (1 - piperidyl)ethyl]piperidine completely cured the animals of the infection at a drug level of 100 mg./kg./day.

Example 28

1 - (4 - chlorophenylcarbamyl) - 2 - [2 - (1 - piperidyl)-ethyl]piperidine was prepared from 9.75 g. of 2-[2-(1-piperidyl)ethyl]piperidine and 7.66 g. of 4-chlorophenyl-isocyanate in 50 ml. of dry benzene using the procedure described in Example 25. There was thus obtained 15.9 g. of 1-(4-chlorophenylcarbamyl)-2-[2-(1-piperidyl)-ethyl]piperidine, M.P. 87–90° C. (corr.).

Analysis.—Calcd. for $C_{19}H_{28}ClN_3O$: Cl, 10.13; N, 12.01. Found: Cl, 10.34; N, 11.96.

Example 29

1 - (4 - chlorophenylthiocarbamyl)-2-[2-(4-methyl-1-piperazinyl)ethyl]piperidine was prepared from 10.25 g. of 2-[2-(4-methyl-1-piperazinyl)ethyl]piperidine and 8.5 g. of 4-chlorophenylisothiocyanate in 80 ml. of absolute ethanol using the procedure described in Example 27. The 10 g. of 1-(4-chlorophenylthiocarbamyl)-2-[2-(4-methyl-1-piperazinyl)ethyl]piperidine thus obtained had the M.P. 143–145° C. (corr.).

Analysis.—Calcd. for $C_{19}H_{29}ClN_4S$: Cl, 9.31; N, 14.71. Found: Cl, 9.40; N, 14.54.

When administered orally to rats infected with the roundworm Strongyloides ratti, 1-(4-chlorophenylthiocarbamyl) - 2 - [2 - (4-methyl-1-piperazinyl)ethyl]piperidine completely cured the animals of the infection at a drug level of 200 mg./kg./day.

Example 30

1 - (4 - nitrophenylcarbamyl)-2-[2-(4-methyl-1-piperazyl)ethyl]piperidine was prepared from 10.5 g. of 2-[2-(4-methyl-1-piperazinyl)ethyl]piperidine and 8.2 g. of 4-nitrophenylisocyanate in 50 ml. of dry benzene using the procedure described in Example 25. Concentration of the benzene solution and trituration of the residue with n-hexane gave a yellow solid which was collected by filtration. There was thus obtained 14.6 g. of 1-(4-nitrophenylcarbamyl)-2-[2-(4 - methyl-1-piperazyl)ethyl]piperidine, M.P. 97–100° C. (corr.).

Analysis.—Calcd. for $C_{19}H_{29}N_5O_3$: C, 60.78; H, 7.79; N, 18.65. Found: C, 60.70; H, 7.94; N, 18.64.

Example 31

1 - (4 - chlorophenylcarbamyl)-2-[2-(4-methyl-1-piperazinyl)ethyl]piperidine was prepared from 10.5 g. of 2-[2-(4-methyl-1-piperazinyl)ethyl]piperidine and 7.6 g. of 4-chlorophenylisocyanate in 50 ml. of benzene using the procedure described in Example 25. There was thus obtained 16.3 g. of 1-(4-chlorophenylcarbamyl)-2-[2-(4-methyl-1-piperazinyl)ethyl]piperidine, M.P. 112–115° C. (corr.).

Analysis.—Calcd. for $C_{19}H_{29}ClN_4O$: Cl, 9.72; N, 15.35. Found: Cl, 9.60; N, 15.06.

When administered orally to hamsters with artifically induced vaginal trichomoniasis, 1-(4-chlorophenylcarbamyl)-2-[2-(4-methyl-1-piperazinyl)ethyl]piperidine was effective at a dose of 100 mg./kg./day.

Example 32

1 - butylthiocarbamyl - 2-[2-(4-methyl-1-piperazinyl) ethyl]piperidine was prepared from 10.5 g. of 2-[2-(4-methyl-1-piperazinyl)ethyl]piperidine and 5.8 g. of n-butylisothiocyanate in 50 ml. of absolute ethanol using the procedure described in Example 27. There was thus obtained 15.1 g. of 1-butylthiocarbamyl-2-[2-(4-methyl-1-piperazinyl)ethyl]piperidine, M.P. 67–70° C. (corr.).

Analysis.—Calcd. for $C_{17}H_{34}N_4S$: N, 17.16; S, 9.82. Found: N, 17.04; S, 9.60.

Example 33

1 - (4 - nitrophenylcarbamyl)-4-[2-(1-piperidyl)ethyl] piperidine was prepared from 9.75 g. of 4-[2-(1-piperidyl) ethyl]piperidine and 8.2 g. of 4-nitrophenylisocyanate in 50 ml. of dry benzene using the procedure described in Example 25. After recrystallization from benzene there was obtained 13.9 g. of 1-(4-nitrophenylcarbamyl)-4-[2-(1-piperidyl)ethyl]piperidine, M.P. 176–179° C. (corr.).

Analysis.—Calcd. for $C_{19}H_{28}N_4O_3$: C, 63.31; H, 7.83; N, 15.54. Found: C, 63.56; H, 8.03; N, 15.80.

Example 34

1 - (4 - chlorophenylthiocarbamyl)-2-[2-(1-hexamethyleniminyl)ethyl]piperidine was prepared from 10.5 g. of 2-[2-(1-hexamethyleniminyl)ethyl]piperidine and 8.5 g. of 4-chlorophenylisothiocyanate in 50 ml. of absolute ethanol using the procedure described in Example 27. There was thus obtained 10.6 g. of 1-(4-chlorophenylthiocarbamyl) - 2-[2-(1-hexamethyleniminyl)ethyl]piperidine, M.P. 159–162° C. (corr.).

Analysis.—Calcd. for $C_{20}H_{30}ClN_3S$: N, 11.06; S, 8.44. Found: N, 11.05; S, 8.71.

Example 35

1 - (4 - nitrophenylcarbamyl) - 2-[2-(1-hexamethyleniminyl)ethyl]piperidine was prepared from 10.5 g. of 2-[2-(1-hexamethyleniminyl)ethyl]piperidine and 8.2 g. of 4-nitrophenylisocyanate in 50 ml. of dry benzene using the procedure described in Example 25. There was thus obtained 11.2 g. of 1-(4-nitrophenylcarbamyl)-2-[2-(1 - hexamethyleniminyl)ethyl]piperidine, M.P. 118–119° C. (corr.).

Analysis.—Calcd. for $C_{20}H_{30}N_4O_3$: C, 64.14; H, 8.08; N, 14.96. Found: C, 64.42; H, 8.22; N, 15.05.

Example 36

1 - (4 - nitrophenylcarbamyl)-2-[2-(1,2,3,4-tetrahydroisoquinolyl-2)ethyl]piperidine was prepared from 12.2 g. of 2 - [2-(1,2,3,4-tetrahydroisoquinolyl-2)ethyl]piperidine and 8.2 g. of 4-nitrophenylisocyanate in 90 ml. of dry benzene using the procedure described in Example 25. There was thus obtained 15.1 g. of 1-(4-nitrophenylcarbamyl) - 2-[2-(1,2,3,4-tetrahydroisoquinolyl - 2)ethyl]piperidine, M.P. 150–154° C. (corr.).

Analysis.—Calcd. for $C_{23}H_{28}N_4O_3$: C, 67.72; H, 6.91; N, 13.72. Found: C, 67.51; H, 6.87; N, 13.89.

Example 37

1 - (4 - nitrophenylcarbamyl)-2-[2-(1-piperidyl)ethyl]piperidine was prepared from 9.75 g. of 2-[2-(1-piperidyl)ethyl]piperidine and 8.2 g. of 4-nitrophenylisocyanate in 50 ml. of dry benzene using the procedure described in Example 25. There was thus obtained 16 g. of 1-(4-nitrophenylcarbamyl)-2-[2-(1-piperidyl)ethyl]piperidine, M.P. 139–141° C. (corr.).

Analysis.—Calcd. for $C_{19}H_{28}N_4O_3$: C, 63.31; H, 7.83; $N_{nitro}$, 3.88. Found: C, 63.32; H, 7.61; $N_{nitro}$, 3.79.

Example 38

1 - (4 - nitrophenylcarbamyl)-2-[2-(4-phenyl-1-piperazinyl)ethyl]piperidine was prepared from 13.7 g. of 2-[2-(4-phenyl-1-piperazinyl)ethyl]piperidine and 8.2 g. of 4-nitro phenylisocyanate in 30 ml. of dry benzene using the procedure described in Example 25. There was thus obtained 18 g. of 1-(4-nitrophenylcarbamyl)-2-[2-(4-phenyl-1-piperazinyl)ethyl]piperidine, M.P. 148–150° C. (corr.).

Analysis.—Calcd. for $C_{24}H_{31}N_5O_3$: C, 65.88; H, 7.14; N, 16.01. Found: C, 65.63; H, 6.89; N, 16.20.

Example 39

1 - (4 - chlorophenylthiocarbamyl)-2-[2-(4-phenyl-1-piperazinyl)ethyl]piperidine was prepared from 13.7 g. of 2 - [2 - (4-phenyl-1-piperazinyl)ethyl]piperidine and 8.5 g. of 4-chlorophenylisothiocyanate in 50 ml. of absolute ethanol using the procedure described above in Example 27. There was thus obtained 21.2 g. of 1-(4-chlorophenylthiocarbamyl) - 2 - [2 - (4-phenyl-1-piperazinyl)ethyl]piperidine, M.P. 182–184° C. (corr.).

Analysis.—Calcd. for $C_{24}H_{31}ClN_4S$: Cl, 8.00; S, 7.24. Found: Cl, 7.94; S, 7.05.

Example 40

1 - (4 - chlorophenylthiocarbamyl) - 2 - [2 - (1,2,3,4-tetrahydroisoquinolyl-2)ethyl]piperidine was prepared from 12.2 g. of 2-[2-(1,2,3,4-tetrahydro-2-isquinolyl)ethyl]piperidine and 8.5 g. of 4-chlorophenylisothiocyanate in 80 ml. of absolute ethanol using the procedure described in Example 27. There was thus obtained 16.7 g. of 1-(4-chlorophenylthiocarbamyl)-2-[2-(1,2,3,4-tetrahydroisoquinolyl-2)ethyl]piperidine, M.P. 187–193° C. (corr.).

Analysis.—Calcd. for $C_{23}H_{28}ClN_3S$: Cl, 8.57; N, 10.15; S, 7.74. Found: Cl, 8.40; N, 10.23; S, 7.73.

Example 41

1 - (4 - chlorophenylthiocarbamyl) - 2 - [2 - (4 - morpholinyl)ethyl]piperidine was prepared from 12.2 g. of 2-[2-(4-morpholinyl)ethyl]piperidine and 8.5 g. of 4-chlorophenylisothiocyanate in 80 ml. of absolute ethanol using the procedure described in Example 27. The 15.5 g. of 1-(4-chlorophenylthiocarbamyl)-2-[2-(4-morpholinyl)ethyl]piperidine thus obtained had the M.P. 158–161° C. (corr.).

Analysis.—Calcd. for $C_{18}H_{26}ClN_3OS$: Cl, 9.64; S, 8.71. Found: Cl, 9.73; S, 8.50.

When administered orally to rats infected with the roundworm *Strongyloides ratti*, 1-(4-chlorophenylthiocarbamyl)-2-[2-(4-morpholinyl)ethyl]piperidine completely cured the animals of the infection at a drug level of 200 mg./kg./day. The oral toxicity was found to be 7400±1950 mg./kg. in twenty-four hours and 2300±643 mg./kg. in seven days.

Example 42

1 - (N,N - diethylcarbamyl) - 2 - [2 - (1 - pyrrolidyl)ethyl]piperidine: To a solution of 27.3 g. of 2-[2-(1-pyrrolidyl)ethyl]piperidine in 100 ml. of dry benzene in a three-necked round bottom flask was added 12.6 g. of sodium bicarbonate. The resultant suspension was rapidly stirred while 20.4 g. of diethylcarbamoyl chloride in 50 ml. of dry benzene was added. After the addition was complete the mixture was stirred for one hour. The solid which separated was removed by filtration and the filtrate concentrated at reduced pressure. The residue was distilled to give 6.1 g. of 1-(N,N-diethylcarbamyl)-2-[2-(1-pyrrolidyl)ethyl]piperidine, B. P. 108–110° C./0.07 mm.

Analysis.—Calcd. for $C_{16}H_{31}N_3O$: $N_{total}$, 14.93; $N_{amino}$, 4.98. Found: $N_{total}$, 14.97; $N_{amino}$, 4.73.

The MEHD of 1-(N,N-diethylcarbamyl)-2-[2-(1-pyrrolidyl)ethyl]piperidine given subcutaneously in the renal hypertensive rat was found to be 0.0025 mg./kg. The maximum drop in blood pressure occurred in twenty-four hours and the hypotensive effect lasted for forty-eight hours.

Example 43

1 - (4 - ethoxyphenylthiocarbamyl) - 2 - [2 - (4-methyl-1-piperazinyl)ethyl]piperidine was prepared from 10.6 g. of 2-[2-(4-methyl-1-piperazinyl)ethyl]piperidine and 8.97 g. of 4-ethoxyphenylisothiocyanate in 75 ml. of absolute ethanol using the procedure described in Example 25. The 1-(4-ethoxyphenylthiocarbamyl)-2-[2-(4-methyl-1-piperazinyl)ethyl]piperidine thus obtained weighed 17.3 g. and had the M.P. 147–148° C. (corr.).

Analysis.—Calcd. for $C_{21}H_{34}N_4OS$: N, 14.35; S, 8.21. Found: N, 14.29; S, 8.18.

Example 44

1 - phenylthiocarbamyl - 2 - [2 - (4 - methyl - 1 - piperazinyl)ethyl]piperidine was prepared from 10.5 g. of 2-[2-(4-methyl-1-piperazinyl)ethyl]piperidine and 6.7 g. of phenylisothiocyanate in 60 ml. of absolute ethanol using the procedure described in Example 27. There was thus obtained 11 g. of 1-phenylthiocarbamyl-2-[2-(4-methyl-1-piperazinyl)ethyl]piperidine, M.P. 117–119° C. (corr.).

Analysis.—Calcd. for $C_{19}H_{30}N_4S$: $N_{total}$, 16.17; $N_{amino}$, 8.08. Found: $N_{total}$, 16.11; $N_{amino}$, 8.09.

Example 45

1 - (4 - chlorophenylthiocarbamyl) - 2 -[2 - (1 - pyrrolidyl)ethyl]piperidine was prepared from 9.1 g. of 2-[2-(1-pyrrolidyl)ethyl]piperidine and 8.5 g. of 4-chlorophenylisothiocyanate is 80 ml. of absolute alcohol using the procedure described in Example 27. There was thus obtained 15.8 g. of 1-(4-chlorophenylthiocarbamyl)-2-[2-(1-pyrrolidyl)ethyl]piperidine, M.P. 148–150° C. (corr.).

Analysis.—Calcd. for $C_{18}H_{26}ClN_3S$: Cl, 10.08; S, 9.11. Found: Cl, 10.25; S, 9.03.

Example 46

1 - (4 - chlorophenylthiocarbamyl) - 2 - [2 - (1 - piperidyl)ethyl]piperidine was prepared from 9.75 g. of 4-[2-(1-piperidyl)ethyl]piperidine and 8.5 g. of 4-chlorophenylisothiocyanate in 80 ml. of absolute alcohol using the procedure described in Example 27. The 1-(4-chlorophenylthiocarbamyl) - 4 - [2 - (1 - piperidyl)ethyl]piperidine thus obtained weighed 11 g. and had the M.P. 136–148° C. (corr.).

Analysis.—Calcd. for $C_{19}H_{28}ClN_3S$: Cl, 9.69; S, 8.76. Found: Cl, 9.87; S, 8.75.

Example 47

1 - (4 - chlorophenylthiocarbamyl) - 5 - ethyl - 2 - [2-(1-piperidyl)ethyl]piperidine was prepared from 11.1 g. of 2-[2-(1-piperidyl)ethyl]-5-ethylpiperidine and 8.5 g. of 4-chlorophenylisothiocyanate in 80 ml. of absolute ethanol using the procedure described in Example 27. There was thus obtained 13.5 g. of 1-(4-chlorophenylisocarbamyl)-5-ethyl-2-[2-(1-piperidyl)ethyl]piperidine, M.P. 178–185° C. (corr.).

Analysis.—Calcd. for $C_{21}H_{32}ClN_3S$: N, 10.66; S, 8.14. Found: N, 10.72; S, 8.17.

When administered orally to rats infected with the round worm *Strongyloides ratti*, 1-(4-chlorophenylthiocarbamyl)-5-ethyl-2-[2-(1-piperidyl)ethyl]piperidine completely cured the animals of the infection at a drug level of 100 mg./kg./day. The oral toxicity was found to be >8000 mg./kg. in twenty-four hours and 2000±324 mg./kg. in seven days.

*Example 48*

1 - (4 - chlorophenylthiocarbamyl) - 4 - [2 - (1 - hexamethyleniminyl)ethyl]piperidine was prepared from 10.5 g. of 4-[2-(1-hexamethyleniminyl)ethyl]piperidine and 8.5 g. of 4-chlorophenylisocyanate in 70 ml. of absolute ethanol using the procedure described in Example 27. There was thus obtained 8 g. of 1-(4-chlorophenylthiocarbamyl) - 4 - [2 - (1 - hexamethyleniminyl)ethyl]piperidine, M.P. 120–122° C. (corr.).

*Analysis.*—Calcd. for $C_{20}H_{30}ClN_3S$: Cl, 9.33; S, 8.44. Found: Cl, 9.54; S, 8.56.

*Example 49*

1 - (4 - chlorophenylthiocarbamyl) - 2 - [2 - (4-methyl-1-piperidyl)ethyl]piperidine was prepared from 10.5 g. of 2-[2-(4-methyl-1-piperidyl)ethyl]piperidine and 8.5 g. of 4-chlorophenylisothiocyanate in 80 ml. of absolute ethanol using the procedure described in Example 27. The 1-(4-chlorophenylthiocarbamyl)-2-[2-(4-methyl-1-piperidyl)ethyl]piperidine thus obtained weighed 15.1 g. and had the M.P. 159–161° C. (corr.).

*Analysis.*—Calcd. for $C_{20}H_{30}ClN_3S$: Cl, 9.33; S, 8.44. Found: Cl, 9.67; S, 8.27.

*Example 50*

1-(4 - chlorophenylthiocarbamyl) - 2-[2-(2-methoxyanilino)-ethyl]piperidine was prepared from 11.7 g. of 2-[2-(2-mthoxyanilino)ethyl]piperidine and 8.5 g. of 4-chlorophenylisothiocyanate in 80 ml. of absolute ethanol using the procedure described in Example 27. There was thus obtained 14.4 g. of 1-(4-chlorophenylthiocarbamyl)-2-[2(-methoxyanilino)ethyl]piperidine, M.P. 152–154° C. (corr.).

*Analysis.*—Calcd. for $C_{21}H_{26}ClN_3OS$: Cl, 8.78; S, 7.94. Found: Cl, 8.65; S, 7.78.

*Example 51*

1-(4 - chlorophenylthiocarbamyl) - 2 - (diethylaminoethyl)piperidine was prepared from 9.2 g. of 2-(2-diethylaminoethyl)piperidine and 8.5 g. of 4-chlorophenylisothiocyanate in 60 ml. of absolute ethanol using the procedure described in Example 27. There was thus obtained 12 g. of 1-(4-chlorophenylthiocarbamyl)-2-(diethylaminoethyl)piperidine, M.P. 130–132° C. (corr.).

*Analysis.*—Calcd. for $C_{18}H_{28}ClN_3S$: Cl, 10.02; S, 9.06. Found: Cl, 10.33; S, 8.97.

*Example 52*

1 - allylthiocarbambyl - 2-[2-(4-methyl-1-piperazinyl) ethyl]piperidine was prepared from 10.6 g. of 2-[2-(4-methyl-1-piperazinyl)ethyl]piperidine and 5 g. of allylisothiocyanate in 60 ml. of absolute ethanol using the procedure described above in Example 27. There was thus obtained 9.7 g. of 1-allylthiocarbamyl-2-[2-(4-methyl-1-piperazinyl)ethyl]piperidine, M.P. 90–91° C. (corr.).

*Analysis.*—Calcd. for $C_{16}H_{30}N_4S$: N, 18.05; S, 10.33. Found: N, 18.13; S, 10.24.

*Example 53*

1 - (4 - chlorophenylthiocarbamyl)-2-[2-(2,6-dimethyl-4-morpholinyl)ethyl]piperidine was prepared from 11.3 g. of 2-[2-(2,6-dimethyl-4-morpholinyl)ethyl]piperidine and 8.5 g. of 4-chlorophenylisothiocyanate in 80 ml. of absolute ethanol using the procedure described in Example 27. The 13.3 g. of 1-(4-chlorophenylthiocarbamyl)-2-[2-(2,6-dimethyl-4-morpholinyl)-ethyl]piperidine thus obtained had the M.P. 174–176° C. (corr.).

*Analysis.*—Calcd. for $C_{20}H_{30}ClN_3OS$: Cl, 8.95; N, 10.61; S, 8.10. Found: Cl, 9.41; N, 10.30; S, 8.24.

When administered orally to rats infected with the roundworm *Strongyloides ratti*, 1-(4-chlorophenylthiocarbamyl)-2[2-(2,6 - dimethyl - 4-morpholinyl)ethyl]piperidine completely cured the animals of the infection at a drug level of 100 mg./kg./day. The oral toxicity was found to be >8000 in twenty-four hours and 6000 mg./kg. in seven days.

*Example 54*

1 - (4 - chlorophenylthiocarbamyl)-5-ethyl - 2-[2-(4-methyl-1-piperazinyl)ethyl]piperidine was prepared from 12 g. of 2-[2-(4-methyl-1-piperazinyl)ethyl]-5-ethylpiperidine, B.P. 102°/.08 mm., from reduction of 1-methyl-4-[2-(5-ethyl-2-pyridyl)piperazine, B.P. 111° C./0.08 mm., and 8.5 g. of 4-chlorophenylisothiocyanate in 50 ml. of absolute ethanol using the procedure described in Example 27. There was thus obtained 6.2 g. of 1-(4-chlorophenylthiocarbamyl)-5-ethyl-2-[2-(4-methyl - 1 - piperazinyl)ethyl]piperidine, M.P. 181–188° C. (corr.).

*Analysis.*—Calcd. for $C_{21}H_{33}ClN_4S$: Cl, 8.67; N, 13.70 Found: Cl, 8.90; N, 13.74.

*Example 55*

1 - (4 - chlorophenylthiocarbamyl)2-(2-anilinoethyl) piperidine was prepared from 10.2 g. of 2-(2-anilinoethyl) piperidine and 8.5 of 4-chlorophenylisothiocyanate in 75 ml. of absolute ethanol using the procedure described in Example 27. There was thus obtained 10 g. of 1-(4-chlorophenylthiocarbamyl) - 2 - (2-anilinoethyl)piperidine, M.P. 174–175° C. (corr.).

*Analysis.*—Calcd. for $C_{20}H_{24}ClN_3S$: Cl, 9.48; S, 8.57. Found: Cl, 9.45; S, 8.54.

*Example 56*

1 - (4 - chlorophenylthiocarbamyl)2-[2-(1-hexamethyleniminyl)ethyl]-5-ethylpiperidine was prepared from 11.9 g. of 2-[2-(1-hexamethyleniminyl)ethyl]-5-ethylpiperidine and 8.5 g. of 4-chlorophenylisothiocyanate in 80 ml. of absolute ethanol using the procedure described in Example 27. There was thus obtained 15.3 g. of 1-(4-chlorophenylthiocarbamyl) - 2 - [2 - (1-hexamethyleniminyl) ethyl]5-ethylpiperidine, M.P. 168–170° C. (corr.).

*Analysis.*—Calcd. for $C_{22}H_{34}ClN_3S$: Cl, 8.69; S, 7.86. Found: Cl, 8.50; S, 7.98.

When administered orally to rats infected with the roundworm *Strongyloides ratti*, 1-(4-chlorophenylthiocarbamyl)-2-[2-(1-hexamethyleniminyl)ethyl] - 5 - ethylpiperidine completely cured the animals of the infection at a drug level of 100 mg./kg./day. The oral toxicity was found to be >4000 mg. /kg. in twenty-four hours and 2280±490 mg./kg. in seven days.

*Example 57*

1 - (4 - chlorophenylthiocarbamyl) - 2-[2-(4-ethyl-1-piperazinyl)ethyl]piperidine was prepared from 11.25 g. of 2-[2-(4-ethyl-1-piperazinyl)ethyl]piperidine and 8.5 g. of 4-chlorophenylisothiocyanate in 70 ml. of absolute ethanol using the procedure described in Example 27. There was thus obtained 9.8 g. of 1-(4-chlorophenylthiocarbamyl) - 2 - [2-(4-ethyl-1-piperazinyl)ethyl]piperidine, M.P. 153–154° C. (corr.).

*Analysis.*—Calcd. for $C_{20}H_{31}ClN_4S$: Cl, 8.98; S, 8.12. Found: Cl, 9.05; S, 8.03.

*Example 58*

1 - (4 - chlorophenylthiocarbamyl) - 4 - [2 - (1,2,3,4-tetrahydroisoquinolyl-2)ethyl]piperidine was prepared from 12.2 g. of 4-[2-(1,2,3,4-tetrahydro-2-isoquinolyl)-ethyl]piperidine and 8.5 g. of 4-chlorophenylisothiocyanate in 80 ml. of absolute ethanol using the procedure described in Example 27. There was thus obtained 16.2 g. of 1 - (4 - chlorophenylthiocarbamyl)-4-[2-(1,2,3,4-tetrahydroisoquinolyl-2)ethyl]piperidine, M.P. 157–160° C. (corr.).

*Analysis.*—Calcd. for $C_{23}H_{28}ClN_3S$: Cl, 8.57; S, 7.74. Found: Cl, 8.63; S, 7.98.

Example 59

1-(3,4-dichlorophenylthiocarbamyl)-2-[2-(1-hexamethyleniminyl)ethyl]piperidine was prepared from 10.5 g. of 2-[2-(1-hexamethyleniminyl)ethyl]piperidine and 10.2 g. of 3,4-dichlorophenylisothiocyanate using the procedure described in Example 27. The 13.6 g. of 1-(3,4-dichlorophenylthiocarbamyl)-2-[2-(1-hexamethyleniminyl)ethyl]piperidine thus obtained had the M.P. 156–158° C. (corr.).

Analysis.—Calcd. for $C_{20}H_{29}Cl_2N_3S$: Cl, 17.11; S, 7.74. Found: Cl, 17.40; S, 7.80.

Example 60

1-(4-chlorophenylthiocarbamyl)-5-ethyl-2-[2-(4-morpholinyl)ethyl]piperidine was prepared from 11.3 g. of 2-[2-(4-morpholinyl)ethyl]-5-ethylpiperidine and 8.5 g. of 4-chlorophenylisothiocyanate in 80 ml. of absolute ethanol using the procedure described above in Example 27. There was thus obtained 14.5 g. of 1-(4-chlorophenylthiocarbamyl)-5-ethyl-2-[2-(4-morpholinyl)ethyl]piperidine, M.P. 171–176° C. (corr.).

Analysis.—Calcd. for $C_{20}H_{30}ClN_3OS$: Cl, 8.95; S, 8.10. Found: Cl, 8.82; S, 8.17.

Example 61

1-(4-chlorophenylthiocarbamyl)-2-[2-(5-ethyl-2-methyl-1-piperidyl)ethyl]piperidine was prepared from 11.9 g. of 2-[2-(2-methyl-5-ethyl-1-piperidyl)ethyl]piperidine and 8.5 g. of 4-chlorophenylisothiocyanate in 80 ml. of absolute ethanol using the procedure described in Example 27. There was thus obtained 3.7 g. of 1-(4-chlorophenylthiocarbamyl)-2-[2-(5-ethyl-2-methyl-1-piperidyl)ethyl]piperidine, M.P. 160–162° C. (corr.).

Analysis.—Calcd. for $C_{22}H_{34}ClN_3S$: Cl, 8.69; S, 7.86. Found: Cl, 8.95; S, 7.93.

Example 62

1-(4-chlorophenylthiocarbamyl)-4-[2-(4-methyl-1-piperazinyl)ethyl]piperidine was prepared from 10.6 g. of 4-[2-(4-methyl-1-piperazinyl)ethyl]piperidine and 8.5 g. of 4-chlorophenylisothiocyanate in 65 ml. of absolute ethanol using the procedure described in Example 27. The 13.9 g. of 1-(4-chlorophenylthiocarbamyl)-4-[2-(4-methyl-1-piperazinyl)ethyl]piperidine thus obtained had the M.P. 134–137° C. (corr.).

Analysis.—Calcd. for $C_{19}H_{29}ClN_4S$: Cl, 9.31; S, 8.41. Found: Cl, 9.45; S, 8.53.

Example 63

1-(2-chlorophenylcarbamyl)-2-[2-(4-morpholinyl)ethyl]piperidine was prepared from 9.85 g. of 2-[2-(4-morpholinyl)ethyl]piperidine and 7.6 g. of 2-chlorophenylisocyanate in 50 ml. of dry benzene using the procedure described in Example 25. There was thus obtained 12.9 g. of 1-(2-[2-(4-morpholinyl)ethyl]piperidine, M.P. 119–120° C. (corr.).

Analysis.—Calcd. for $C_{18}H_{26}ClN_3O_2$: Cl, 10.08; N, 11.94. Found: Cl, 9.88; N, 11.92.

Example 64

1-(4-chlorophenylthiocarbamyl)-2-(2-anilinoethyl)-5-ethylpiperidine was prepared from 11.6 g. of 2-(2-anilinoethyl)-5-ethylpiperidine and 8.5 g. of 4-chlorophenylisothiocyanate in 80 ml. of absolute ethanol using the procedure described in Example 27. There was thus obtained 3.1 g. of 1-(4-chlorophenylthiocarbamyl)-2-(2-anilinoethyl)-5-ethyl-piperidine, M.P. 215–224° C. (corr.).

Analysis.—Calcd. for $C_{22}H_{28}ClN_3S$: Cl, 8.82; S, 7.98. Found: Cl, 9.15; S, 7.88.

Example 65

1-(4-chlorophenylthiocarbamyl)-2-[2-(2-methylanilino)ethyl]piperidine was prepared from 10.8 g. of 2-[2-(2-methylanilino)ethyl]piperidine and 8.5 g. of 4-chlorophenylisothiocyanate in 80 ml. of absolute ethanol using the procedure described in Example 27. The 11.7 g. of 1-(4-chlorophenylthiocarbamyl)-2-[2-(2-methylanilino)ethyl]piperidine thus obtained had the M.P. 171–174° C. (corr.).

Analysis.—Calcd. for $C_{21}H_{26}ClN_3S$: Cl, 9.14; S, 8.26. Found: Cl, 8.90; S, 8.23.

Example 66

1-(4-chlorophenylthiocarbamyl)-2-[2-(2-methyl-1-piperidyl)ethyl]piperidine was prepared from 10.5 g. of 2-[2-(2-methyl-1-piperidyl)ethyl]piperidine and 8.5 g. of 4-chlorophenylisothiocyanate in 80 ml. of absolute ethanol using the procedure described in Example 27. There was thus obtained 12.2 g. of 1-(4-chlorophenylthiocarbamyl)-2-[2-(2-methyl-1-piperidyl)ethyl]piperidine, M.P. 118–120° C. (corr.).

Analysis.—Calcd. for $C_{20}H_{30}ClN_3S$: Cl, 9.33; S, 8.44. Found: Cl, 9.60; S, 8.66.

Example 67

1-(4-chlorophenylthiocarbamyl)-5-ethyl-2-[2-(1-pyrrolidyl)ethyl]piperidine was prepared from 10.5 g. of 2-[2-(1-pyrrolidyl)ethyl]piperidine and 8.5 g. of 4-chlorophenylisothiocyanate in 80 ml. of absolute ethanol using the procedure described in Example 27. There was thus obtained 12.7 g. of 1-(4-chlorophenylthiocarbamyl)-5-ethyl-2-[2-(1-pyrrolidyl)ethyl]piperidine, M.P. 183–184° C. (corr.).

Analysis.—Calcd. for $C_{20}H_{30}ClN_3S$: Cl, 9.33; S, 8.44. Found: Cl, 9.24; S, 8.58.

When administered orally to rats infected with the roundworm *Strongyloides ratti*, 1-(4-chlorophenylthiocarbamyl)-5-ethyl-2-[2-(1-pyrrolidyl)ethyl]piperidine completely cured the animals of the infection at a drug level of 75 mg./kg./day. The oral toxicity was found to be >4000 mg./kg. in twenty-four hours and 2280±490 mg./kg. in seven days.

Example 68

1-(4-chlorophenylthiocarbamyl)-2-[2-(1-decahydroquinolyl)ethyl]piperidine was prepared from 12.5 g. of 2-[2-(1-decahydroquinolyl)ethyl]piperidine and 8.5 g. of 4-chlorophenylisothiocyanate in 80 ml. of absolute ethanol using the procedure described in Example 27. There was thus obtained 4.2 g. of 1-(4-chlorophenylthiocarbamyl)-2-[2-(1-decahydroquinolyl)ethyl]piperidine, M.P. 171–174° C. (corr.).

Analysis.—Calcd. for $C_{23}H_{34}ClN_3S$: Cl, 8.44; S, 7.63. Found: Cl, 8.20; S, 7.77.

Example 69

1-(4-chlorophenylthiocarbamyl)-2-[2-(2,6-dimethyl-4-morpholinyl)ethyl]-5-ethylpiperidine was prepared from 12.7 g. of 2-[2-(2,6-dimethyl-4-morpholinyl)ethyl]-5-ethylpiperidine and 8.5 g. of 4-chlorophenylisothiocyanate in 80 ml. of absolute ethanol using the procedure described in Example 27. There was thus obtained 10.9 g. of 1-(4-chlorophenylthiocarbamyl)-2-[2-(2,6-dimethyl-4-morpholinyl)ethyl]-5-ethylpiperidine, M.P. 198–199° C. (corr.).

Analysis.—Calcd. for $C_{22}H_{34}ClN_3OS$: Cl, 8.36; N, 9.91. Found: Cl, 8.35; N, 10.22.

Example 70

1-(4-chlorophenylthiocarbamyl)-4-[2-(4-morpholinyl)ethyl]piperidine was prepared from 9.9 g. of 4-[2-(4-morpholinyl)ethyl]piperidine and 8.5 g. of 4-chlorophenylisothiocyanate in 80 ml. of absolute ethanol using the procedure described in Example 27. There was thus obtained 14.4 g. of 1-(4-chlorophenylthiocarbamyl)-4-[2-(4-morpholinyl)ethyl]piperidine, M.P. 134–136° C. (corr.).

Analysis.—Calcd. for $C_{18}H_{26}ClN_3OS$: Cl, 9.64; S, 8.71. Found: Cl, 9.70; S, 8.83.

Example 71

1-(4-chlorophenylcarbamyl)-2-[2-(4-phenyl-1-piperazinyl)ethyl]piperidine was prepared from 13.7 g. of 2-[2-

(4-phenyl - 1 - piperazinyl)ethyl]piperidine and 7.7 g. of 4-chlorophenylisocyanate in 50 ml. of dry benzene using the procedure described in Example 25. There was thus obtained 11.7 g. of 1-(4-chlorophenylcarbamyl)-2-[2-(4-phenyl-1-piperazinyl)ethyl]piperidine, M.P. 144–145° C. (corr.).

*Analysis.*—Calcd. for $C_{24}H_{31}ClN_4O$: C, 67.51; H, 7.13; Cl, 8.54. Found: C, 67.46; H, 7.13; Cl, 8.54.

Example 72

1 - (2 - chlorophenylthiocarbamyl) - 2 - [2-(1 - hexamethyleniminyl)ethyl]piperidine was prepared from 10.5 g. of 2-[2-(1 - hexamethyleniminyl)ethyl]piperidine and 8.5 g. of 2-chlorophenylisothiocyanate in 60 ml. of absolute ethanol using the procedure described in Example 27. There was thus obtained 16.3 g. of 1-(2-chlorophenylthiocarbamyl)-2-[2 - (1 - hexamethyleniminyl)-ethyl]piperidine, M.P. 115–118° C. (corr.).

*Analysis.*—Calcd. for $C_{20}H_{30}ClN_3S$: Cl, 9.33; N, 11.06. Found: Cl, 9.35; N, 11.21.

Example 73

1 - (2 - ethoxyphenylcarbamyl) - 2 - [2-(1-piperidyl)ethyl]piperidine was prepared from 9.8 g. of 2-[2-(1-piperidyl)ethyl]piperidine and 8.2 g. of 2-ethoxyphenylisocyanate in 50 ml. of dry benzene using the procedure described in Example 25. The mixture was concentrated at reduced pressure and the residue distilled to give 12.7 of 1-(2-ethoxyphenylcarbamyl)-2-[2-(2-piperidyl)ethyl]-piperidine, B.P. 130.2/0.21 mm.

*Analysis.*—Calcd. for $C_{21}H_{33}N_3O_2$: $N_{total}$, 11.69; $N_{amino}$, 3.89. Found: $N_{total}$, 11.77; $N_{amino}$, 4.18.

Example 74

1 - (N,N-dimethylcarbamyl)-2-[2-(1-pyrrolidyl)ethyl]-piperidine was prepared from 27.3 g. of 2-[2-(1-pyrrolidyl)ethyl]piperidine, 12.6 g. of sodium bicarbonate and 16.1 g. of dimethylcarbamoyl chloride in 150 ml. of dry benzene using the procedure described in Example 42. There was thus obtained 8.8 g. of 1-(N,N-dimethylcarbamyl)-2-[2 - (1 - pyrrolidyl)ethyl]piperidine, B.P. 118–119° C./0.15 mm.

*Analysis.*—Calcd. for $C_{14}H_{27}N_3O$: $N_{total}$, 16.58; $N_{amino}$, 5.53. Found: $N_{total}$, 16.49; $N_{amino}$, 5.37.

Example 75

1 - (2 - methoxyphenylcarbamyl)-2-[2-(4-methyl-1-piperazinyl)ethyl]-5-ethylpiperidine was prepared from 12 g. of 2-[2-(4-methyl-1-piperazinyl)ethyl]-5-ethylpiperidine and 7.5 g. of 2-methoxyphenylisocyanate in 50 ml. of dry benzene using the procedure described in Example 73. There was thus obtained 7.2 g. of 1-(2-methoxyphenylcarbamyl)-2 - [2(4-methyl-1-piperazinyl)ethyl]-5-ethylpiperidine, B.P. 129–133° C./0.23 mm.

*Analysis.*—Calcd. for $C_{22}H_{36}N_4O_2$: $N_{total}$, 14.42; $N_{amino}$, 7.27. Found: $N_{total}$, 14.35; $N_{amino}$, 7.43.

Example 76

1 - (2 - chlorophenylcarbamyl)-2-[2 - (2,6-dimethyl-4-morpholinyl)ethyl]piperidine was prepared from 11.3 g. of 2 - [2 - (2,6-dimethyl-4-morpholinyl)ethyl]piperidine and 7.7 g. of 2-chlorophenylisocyanate in 50 ml. of dry benzene using the procedure described in Example 73. There was thus obtained 12.5 g. of 1-(2-chlorophenylcarbamyl)-2-[2-(2,6-dimethyl-4-morpholinyl)ethyl]piperidine, M.P. 108–109° C. (corr.).

*Analysis.*—Calcd. for $C_{20}H_{30}ClN_3O_2$: Cl, 9.33; N, 11.06. Found: Cl, 9.27; N, 11.01.

Example 77

1 - (4 - chlorophenylthiocarbamyl)-2-[2-(4 - hydroxyethyl-1-piperazinyl)ethyl]piperidine was prepared from 12.05 g. of 2-[2-(4-hydroxyethyl-1-piperazinyl)ethyl]piperidine and 8.5 g. of 4-chlorophenylisothiocyanate in 75 ml. of absolute ethanol using the procedure described above in Example 27. There was thus obtained 10 g. of 1-(4-chlorophenylthiocarbamyl)-2-[2-(4-hydroxyethyl-1-piperazinyl)ethyl]piperidine, M.P. 154–155° C. (corr.).

*Analysis.*—Calcd. for $C_{20}H_{31}ClN_4OS$: Cl, 8.65; S, 7.80. Found: Cl, 8.40; S, 8.05.

Example 78

1 - (4 - chlorobenzylthiocarbamyl)-2-[2 - (1 - hexamethyleniminyl)ethyl]piperidine was prepared from 10.5 g. of 2 - [2-(1-hexamethylenimnyl)ethyl]piperidine and 9.2 g. of 4-chlorobenzylisothiocyanate in 50 ml. of absolute ethanol using the procedure described in Example 27. There was thus obtained 14.4 g. of 1-(4-chlorobenzylthiocarbamyl) - 2 - [2 - 1 - hexamethyleniminyl)-ethyl]piperidine, M.P. 107–108° C. (corr.).

*Analysis.*—Calcd. for $C_{21}H_{32}ClN_3S$: N, 10.66; S, 8.14. Found: N, 10.80; S, 8.35.

Example 79

1 - diethylcarbamyl - 2 - [2 - (4-methyl-1-piperazinyl)ethyl]piperidine was prepared from 21.1 g. of 2-[2(4-methyl-1-piperazinyl)ethyl]piperidine, 8.4 g. of sodium bicarbonate and 13.6 g. of diethylcarbamoyl chloride in 110 ml. of dry benzene using the procedure described in Example 42. There was thus obtained 9.8 g. of 1-diethylcarbamyl - 2 - [2 - (4-methyl-1-piperazinyl)ethyl]piperidine, B.P. 120° C./0.03 mm.

*Analysis.*—Calcd. for $C_{17}H_{34}N_4O$: C, 65.76; H, 11.04; N, 18.05. Found: C, 65.63; H, 11.29; N, 17.92.

Example 80

1 - (4 - chlorophenylthiocarbamyl)-2-[2-(3-methyl-1-piperidyl)ethyl]piperidine was prepared from 10.5 g. of 1-[2-(3-methyl-1-piperidyl)ethyl]piperidine and 8.5 g. of 4-chlorophenylisothiocyanate in 75 ml. of absolute ethanol using the procedure described above in Example 27. There was thus obtained 14 g. of 1-(4-chlorophenylthiocarbamy)-2-[2 - (3. - methyl-1-piperidyl)ethyl]piperidine, M.P. 148–149° C. (corr.).

*Analysis.*—Calcd. for $C_{20}H_{30}ClN_3S$: Cl, 9.33; N, 11.06. Found: Cl, 9.50; N, 11.06.

Example 81

1 - (4 - bromophenylthiocarbamyl)-2-[2-(1 - hexamethyleniminyl)ethyl]piperidine was prepared from 10.5 g. of 2-[2-(1-hexamethyleniminyl)ethyl]piperidine and 10.7 g. of 4-bromophenylisothiocyanate in 75 ml. of absolute alcohol using the procedure described above in Example 27. There was thus obtained 16 g. of 1-(4-bromophenylthiocarbamyl) - 2 - [2 - (1 - hexamethyleniminyl(ethyl]piperidine, M.P. 167–168° C. (corr.).

*Analysis.*—Calcd. for $C_{20}H_{30}BrN_3S$: Br, 18.83; N, 9.90. Found: Br, 18.50; N, 10.10.

Example 82

1 - (4 - chlorophenylthiocarbamyl)-5-ethyl-2-[2-(4-methyl-1-piperidyl(ethyl]piperidine was prepared from 2[2-(4 - methyl-1-piperidyl)ethyl]-5-ethylpiperidine and 8.5 g. of 4-chlorophenylisothiocyanate in 75 ml. of absolute ethanol using the procedure described in Example 27. There was thus obtained 6 g. of 1-(4-chlorophenylthiocarbamyl) - 4 - ethyl - 2 - [2-(4-methyl-1-piperidyl)ethyl]piperidine, M.P. 173–175° C. (corr.).

*Analysis.*—Calcd. for $C_{22}H_{34}ClN_3S$: Cl, 8.69; N, 10.30. Found: Cl, 8.64; N, 10.63.

Example 83

1-(N,N-diethylcarbamyl)-2-[2-(4 - phenyl - 1 - piperazinyl)-ethyl]piperidine was prepared from 12.6 g. of sodium bicarbonate, 41 g. of 2-[2-(4-phenyl-1-piperazinyl)ethyl]piperidine and 20.4 g. of diethylcarbamoyl chloride in 150 ml. of dry benzene using the procedure in Example 42. There was thus obtained 10.6 g. of 1-(N,N-diethylcarbamyl)-2-[2-(4-phenyl - 1 - piperazinyl)ethyl]piperidine, B.P. 182–186° C. (corr.).

Example 84

1-(4-chlorophenylthiocarbamyl) - 2 - [2 - (4 - ethyl-1-piperazinyl)ethyl]piperidine was reported from 12.6 g. of 2-[2-(4-ethyl-1-piperazinyl)ethyl]piperidine and 8.5 g. of 4-chlorophenylisothiocyanate in 75 ml. of absolute ethanol using the procedure described in Example 27. There was thus obtained 3.3 g. of 1-(4-chlorophenylthiocarbamyl) - 2 - [2 - (4 - ethyl-1-piperazinyl)ethyl]piperidine, M.P. 104–105° C. (corr.).

*Analysis.*—Calcd. for $C_{22}H_{35}ClN_4S$: Cl, 8.38; $N_{amino}$, 6.62. Found: Cl, 8.23; $N_{amino}$, 6.66.

Example 85

1-(4-nitrophenylcarbamyl) - 2 - [2 - (4 - morpholinyl)-ethyl]piperidine was prepared from 9.9 g. of 2-[2-(4-morpholinyl)ethyl]piperidine and 8.2 g. of 4-nitrophenylisocyanate in 130 ml. of dry benzene using the procedure described above in Example 25. Recrystallization from a dioxane-pentane mixture gave 14.7 g. of 1-(4-nitrophenylcarbamyl)-2-[2-(4 - morpholinyl)ethyl]piperidine, M.P. 138–139° C. (corr.).

*Analysis.*—Calcd. for $C_{18}H_{26}N_4O_4$: C, 59.65; H, 7.23; $N_{nitro}$, 3.87. Found: C, 59.18; H, 6.92; $N_{nitro}$, 3.86.

Example 86

1-(3-chlorophenylthiocarbamyl)-2-[2 - (1 - hexamethyleniminyl)ethyl]piperidine was prepared from 10.5 g. of 2-[2-(1-hexamethyleniminyl)ethyl]piperidine and 8.5 g. of 3-chlorophenylisothiocyanate in 75 ml. of absolute ethanol using the procedure described in Example 27. After recrystallization from absolute ethanol there was obtained 17 g. of 1-(3-chlorophenylthiocarbamyl)-2-[2-(1-hexamethyleniminyl)ethyl]piperidine, M.P. 104–105° C. (corr.).

*Analysis.*—Calcd. for $C_{20}H_{30}ClN_3S$: Cl, 9.33; S, 8.44. Found: Cl, 9.37; S, 8.58.

Example 87

1-(2-chlorophenylthiocarbamyl)-2-[2 - (1 - piperidyl)-ethyl]-5-ethylpiperidine was prepared from 11.1 g. of 2-[2-(1-piperidyl)ethyl]-5-ethylpiperidine and 8.5 g. of 2-chlorophenylisothiocyanate in 65 ml. of absolute ethanol using the procedure described in Example 27. Recrystallization from ethanol gave 11.7 g. of 1-(2-chlorophenylthiocarbamyl)-2-[2-(1-piperidyl)ethyl] - 5 - ethylpiperidine, M.P. 101–102° C. (corr.).

*Analysis.*—Calcd. for $C_{21}H_{32}ClN_3S$: Cl, 9.00; S, 8.14. Found: Cl, 9.09; S, 8.13.

Example 88

1-(2-chlorophenylthiocarbamyl) - 2 - [2-(1-pyrrolidyl)-ethyl]-5-ethylpiperidine was prepared from 10.5 g. of 2-[2-(1-pyrrolidyl)ethyl]-5-ethylpiperidine and 2-chlorophenylisothiocyanate in 55 ml. of absolute ethanol using the procedure described in Example 27. After recrystallization from absolute ethanol there was obtained 14 g. of 1-(2 - chlorophenylthiocarbamyl)-2-[2-(1-pyrrolidyl)-ethyl]-5-ethylpiperidine, M.P. 115–116° C. (corr.).

*Analysis.*—Calcd. for $C_{20}H_{30}ClN_3S$: Cl, 9.33; S, 8.44. Found: Cl, 9.41; S, 8.43.

Example 89

1-(2-chlorophenylthiocarbamyl) - 2 - [2 - (4-methyl-1-piperazinyl)ethyl]piperidine was prepared from 10.25 g. of 2-[2-(4-methyl-1-piperazinyl)ethyl]piperidine and 8.5 g. of 2-chlorophenylisothiocyanate in 50 ml. of absolute ethanol using the procedure described above in Example 27. Recrystallization from a pentane-benzene mixture gave 8.6 g. of 1-(2-chlorophenylthiocarbamyl)-2-[2-(4-methyl-1-piperazinyl)ethyl]piperidine, M.P. 128.6–129.2° C. (corr.).

*Analysis.*—Calcd. for $C_{19}H_{29}ClN_4S$: Cl, 9.31; S, 8.41. Found: Cl, 9.41; S, 8.62.

Example 90

1-(N,N-diethylcarbamyl) - 2 - [2-(4-morpholinyl)ethyl]piperidine was prepared from 8.4 g. of sodium bicarbonate, 19.7 g. of 2-[2-(4-morpholinyl)ethyl]piperidine and 13.6 g. of diethylcarbamoyl chloride in 110 ml. of dry benzene using the procedure described in Example 42. There was thus obtained 8.3 g. of 1-(N,N-diethylcarbamyl) - 2 - [2 - (4-morpholinyl)ethyl]piperidine, B.P. 126° C./0.08 mm.

*Analysis.*—Calcd. for $C_{16}H_{31}N_3O_2$: C, 64.61; H, 10.51; N, 14.13. Found: C, 64.70; H, 10.58; N, 14.05.

Example 91

1-(N,N-diethylcarbamyl) - 2 - [2-(1-hexamethyleniminyl)ethyl]piperidine was prepared from 8.4 g. of sodium bicarbonate, 21 g. of 2-[2-(1-hexamethyleniminyl)ethyl]-piperidine and 13.6 g. of diethylcarbamoyl chloride in 110 ml. of dry benzene using the procedure described in Example 42. There was thus obtained 5.5 g. of 1-(N,N-diethylcarbamyl)-2-[2-(1 - hexamethyleniminyl)ethyl]-piperidine, B.P. 152° C./0.5 mm.

*Analysis.*—Calcd. for $C_{18}H_{35}N_3O$: C, 69.85; H, 11.40; N, 13.58. Found: C, 70.14; H, 11.13; N, 13.58.

Example 92

1 - (4 - chlorophenylthiocarbamyl) - 2 - (1 - pyrrolidylmethyl)piperidine was prepared from 8.4 g. of 2-(1-pyrrolidylmethyl)piperidine and 8.5 g. of p-chlorophenylisothiocyanate in 30 ml. of anhydrous ethanol using the procedure described in Example 27. After recrystallization from ethanol there was obtained 10.5 g. of 1-(4-chlorophenylthiocarbamyl)-2-(1 - pyrrolidylmethyl)piperidine, M.P. 110–110.6° C. (corr.).

*Analysis.*—Calcd. for $C_{17}H_{24}ClN_3S$: Cl, 10.49; N, 12.44. Found: Cl, 10.50; N, 12.53.

Example 93

1 - (4 - chlorophenylthiocarbamyl) - 3 - (1-pyrrolidylmethyl)piperidine was prepared from 8.4 g. of 3-(1-pyrrolidylmethyl)piperidine and 8.5 g. of 4-chlorophenylisothiocyanate in 25 ml. of anhydrous ethanol using the procedure described in Example 27. After recrystallization from absolute ethanol there was obtained 14.1 g. of 1-(4-chlorophenylthiocarbamyl)-3-(1 - pyrrolidylmethyl)piperidine, M.P. 160–161° C. (corr.).

*Analysis.*—Calcd. for $C_{17}H_{24}ClN_3S$: Cl, 10.49; N, 12.44. Found: Cl, 10.44; N, 12.58.

Example 94

1 - (4 - chlorophenylthiocarbamyl) - 2 - [2 - (2-diethylamino)ethyl]-6-methylpiperidine was prepared from 9.9 g. of 2-[2-(2-diethylamino)ethyl]-6-methylpiperidine and 8.5 g. of 4-chlorophenylisothiocyanate in 25 ml. of absolute ethanol using the procedure described in Example 27. The 14.5 g. of 1-(4-chlorophenylthiocarbamyl)-2-[2-(2-diethylamino)ethyl]-6-methylpiperidine thus obtained had the M.P. 123–125° C. (corr.).

*Analysis.*—Calcd. for $C_{19}H_{30}ClN_3S$: Cl, 9.64; N, 11.42. Found: Cl, 9.73; N, 11.22.

Example 95

(a) 2 - [2-(4-hydroxyethyl - 1 - piperazinyl)ethyl]-5-ethylpyridine was prepared from 125 g. of 1-(2-hydroxyethyl)-piperazine and 133 g. of 5-ethyl-2-vinylpyridine using the procedure described above in Example 4(a). After distillation in vacuo there was obtained 181 g. of 2-[2-(4-hydroxyethyl - 1 - piperazinyl)ethyl]-5-ethylpyridine, B.P. 176° C./0.26 mm.

*Analysis.*—Calcd. for $C_{15}H_{25}N_3O$: C, 68.40; H, 9.57; N, 15.95. Found: C, 67.68; H, 9.44; N, 15.86.

(b) 2-[2-(4 - hydroxyethyl - 1 - piperazinyl)ethyl]-5-ethylpiperidine was prepared by hydrogenation of 181 g. of 2-[2-(4-hydroxyethyl-1-piperazinyl)ethyl]-5-ethylpyridine using the procedure described above in Example 1(a). Distillation gave 84.3 g. of 2-[2-(4-hydroxyethyl- 1-piperazinyl)ethyl]-5-ethylpiperidine, B.P. 156–159° C./ 0.08 mm.

*Analysis.*—Calcd. for $C_{15}H_{31}N_3O$: C, 66.86; H, 11.60; N, 15.60. Found: C, 66.85; H, 11.61; N, 15.10.

(c) 1-(4 - chlorophenylthiocarbamyl)-5-ethyl-2-[2-(4-hydroxyethyl-1-piperazinyl)ethyl]piperidine was prepared from 13.5 g. of 2-[2-(4-hydroxyethyl - 1 - piperazinyl)-ethyl]-5-ethylpiperidine and 8.5 g. of p-chlorophenyliso-thiocyanate in 70 cc. of absolute ethanol using the procedure described in Example 27. There was thus obtained 4 g. of 1-(4-chlorophenylthiocarbamyl)-5-ethyl-2-[2-(4 - hydroxyethyl - 1 - piperazinyl)ethyl]piperidine, M.P. 142–146° C. (corr.).

*Analysis.*—Calcd. for $C_{22}H_{35}ClN_4OS$: Cl, 8.08; S, 7.30. Found: Cl, 8.09; S, 6.97.

Example 96

(a) 3-[2 - (2 - pyridyl)ethyl] - 3 - azabicyclo[3,2,2]-nonane was prepared from 125 g. of 3-azabicyclo[3,2,2]-nonane and 105 g. of 2-vinylpyridine using the procedure described above in Example 4(a). There was thus obtained 160 g. of 3-[2-(2-pyridyl)ethyl] - 3 - azabicyclo-[3,2,2]nonane, B.P. 126–127° C./0.2 mm.

*Analysis.*—Calcd. for $C_{15}H_{22}N_2$: C, 78.21; H, 9.63; N, 12.16. Found: C, 77.94; H, 9.53; N, 12.10.

(b) 3-[2-(2 - piperidyl)ethyl] - 3 - azabicyclo[3,2,2]-nonane was prepared by hydrogenation of 155 g. of 3-[2-(2-pyridyl)ethyl]-3-azabicyclo[3,2,2]nonane using the procedure described above in Example 1(a). There was thus obtained 37 g. of 3-[2-(2-piperidyl)ethyl]-3-azabi-cyclo[3,2,2]nonane, B.P. 126° C./0.7 mm.

*Analysis.*—Calcd. for $C_{15}H_{28}N_2$: C, 76.21; H, 11.94; N, 11.87. Found: C, 75.91; H, 11.95; N, 12.16.

(c) 1 - carbamyl-2-[2 - (3 - azabicyclo[3,2,2]nonyl)-ethyl]piperidine was prepared from 23.6 g. of 3-[2-(2-piperidyl)ethyl]-3-azabicyclo[3,2,2]nonane and 16.2 g. of potassium cyanate using the procedure described above in Example 1(b). Recrystallization from ethyl acetate gave 11.3 g. of 1-carbamyl-2-[2-(3-azabicyclo[3,2,2]nonyl)-ethyl]piperidine, M.P. 121–124° C. (corr.).

*Analysis.*—Calcd. for $C_{16}H_{29}N_3O$: C, 68.77; H, 10.46; N, 15.04. Found: C, 69.00; H, 10.72; N, 15.09.

Example 97

(a) 2-[2-(4-phenyl - 1 - piperazinyl)ethyl]-5-ethylpyri-dine was prepared from 116 g. of 1-phenylpiperazine and 95 g. of 5-ethyl-2-vinylpyridine using the procedure described in Example 4(a). After recrystallization from n-hexane there was obtained 144 g. of 2-[2-(4-phenyl-1-piperazinyl)ethyl] - 5 - ethylpyridine, M.P. 75–76° C. (corr.).

*Analysis.*—Calcd. for $C_{19}H_{25}N_3$: C, 77.25; H, 8.53; N, 14.22. Found: C, 77.33; H, 8.32; N, 14.31.

(b) 2-[2-(4 - phenyl - 1 - piperazinyl)ethyl]-5-ethyl-piperidine was prepared by hydrogenation of 118 g. of 2-[2-(4-phenyl-1-piperazinyl)ethyl]-5-ethylpyridine using the procedure described above in Example 1(a). The 57.6 g. of 2-[2-(4-phenyl - 1 - piperazinyl)ethyl]-5-ethyl-piperidine obtained had the B.P. 182° C./0.2 mm.

*Analysis.*—Calcd. for $C_{19}H_{31}N_3$: C, 75.69; H, 10.37; N, 13.94. Found: C, 75.48; H, 10.20; N, 13.99.

(c) 1 - carbamyl-2-[2-(4-phenyl-1-piperazinyl)ethyl]-5-ethylpiperidine was prepared from 24 g. of 2-[2-(4-phenyl-1-piperazinyl)ethyl]5-ethylpiperidine and 13 g. of potassium cyanate using the procedure described in Example 1(b). Recrystallization from methanol gave 3.2 g. of 1 - carbamyl-2-[2-(4-phenyl-1-piperazinyl)ethyl]-5-ethylpiperidine, M.P. 187–190° C. (corr.).

*Analysis.*—Calcd. for $C_{20}H_{32}N_4O$: C, 69.73; H, 9.36; N, 16.26. Found: C, 70.00; H, 9.63; N, 16.37.

Example 98

(a) 4-[2-(4-phenyl - 1 - piperazinyl)ethyl]pyridine was prepared from 116 g. of 1-phenylpiperazine and 75 g. of 4-vinylpyridine using the procedure described in Example 4(a). There was thus obtained 110 g. of 4-[2-(4-phenyl-1-piperazinyl)-ethyl]pyridine, M.P. 82–86° C. (corr.).

*Analysis.*—Calcd. for $C_{17}H_{21}N_3$: C, 76.37; H, 7.92; N, 15.72. Found: C, 76.72; H, 7.63; N, 15.73.

(b) 4-[2-(4-phenyl-1-piperazinyl)ethyl]piperidine was prepared by hydrogenation of 110 g. of 4-[2-(4-phenyl-1-piperazinyl)ethyl]pyridine using the procedure described in Example 1(a). There was thus obtained 54 g. of 4-[2-(4-phenyl - 1 - piperazinyl)ethyl]piperidine, M.P. 96–98° C.

(c) 1 - carbamyl-4-[2-(4-phenyl-1-piperazinyl)ethyl]-piperidine was prepared from 20 g. of 4-[2-(4-phenyl-1-piperazinyl)ethyl]piperidine and 11.9 g. of potassium cyanate using the procedure described in Example 1(b). The 1 - carbamyl-4-[2-(4-phenyl - 1 - piperazinyl)ethyl]-piperidine thus obtained had the M.P. 184–187° C. (corr.).

*Analysis.*—Calcd. for $C_{18}H_{28}N_4O$: C, 68.32; H, 8.92; N, 17.71. Found: C, 68.59; H, 8.68; N, 17.54.

The following compounds further illustrative of the invention were prepared using the general procedures described above:

1-(N,N-diethylcarbamyl)-2 - (2 - diethylaminoethyl)-piperidine, B.P. 124° C./0.5 mm. by reaction of 2-(2-diethylaminoethyl)piperidine with diethylcarbamoylchloride;

1-(2-chlorophenylcarbamyl) - 2 - [2 - (1 - pyrrolidyl)-ethyl]-piperidine, M.P. 100–103° C. (corr.) by reaction of 2-[2-(1-pyrrolidyl)ethyl]piperidine with 2-chlorophen-ylisocyanate;

1 - (2-chlorophenylcarbamyl)-2-[2-(1-piperidyl)ethyl]-piperidine, M.P. 112–114° C. (corr.), by reaction of 2-[2-(1-piperidyl)ethyl]piperidine with 2-chlorophenyliso-cyanate;

1 - diethylcarbamyl-2-(2-diethylaminoethyl)-6-methyl-piperidine, B.P. 103° C./0.06 mm., by reaction of 2-(2-diethylaminoethyl) - 6 - methylpiperidine with diethylcar-bamoyl chloride;

1-(2 - chlorophenylcarbamyl)-2-[2-(4-phenyl-1-pipera-zinyl)ethyl]piperidine, M.P. 87–91° C. (corr.);

1 - (N,N -dimethylcarbamyl) - 2 - [2 - (4 - phenyl - 1-piperazinyl)-ethyl]piperidine, M.P., dihydrochloride salt 173–178° C. (corr.), by reaction of 2-[2-(4-phenyl-1-piperazinyl)ethyl]piperidine and dimethylcarbamoyl chloride followed by reaction with ethereal hydrogen chloride;

1 - (4-nitrophenylthiocarbamyl)-2-[2-(1 - piperidyl)-ethyl]-5-ethylpiperidine, M.P. 192–195° C., by reaction of 2- [2-(1-piperidyl)ethyl] - 5 - ethylpiperidine with 4-nitrophenylisothiocyanate;

1 - (3-methylphenylcarbamyl)-2-[2-(4 - morpholinyl)-ethyl]-piperidine, M.P. 98–101° C. (corr.), by reaction of 2-[2-(4-morpholinyl)ethyl]piperidine with 3-methyl-phenylisocyanate;

1 - (4-chlorophenylthiocarbamyl)-2-[2-(1 - piperidyl)-ethyl]-6-methylpiperidine, M.P. 124–127° C. (corr.), by reaction of 2-[2-(1-piperidyl)ethyl]-6 - methylpiperidine with 4-chlorophenylisothiocyanate;

1 - (4-chlorophenylthiocarbamyl)-2-[2-(1-pyrrolidyl)-ethyl]-6-methylpiperidine by reaction of 2-[2-(1-pyrrol-idyl)-ethyl]-6-methylpiperidine with 4-chlorophenyliso-thiocyanate;

1 - (4-chlorophenylthiocarbamyl) - 2-[2-(1-azacyclo-heptyl)ethyl]-6-methylpiperidine, M.P. 118–121° C. (corr.), by reaction of 2-[2-(1-azacycloheptyl)ethyl]-6-methylpiperidine with 4-chlorophenylisothiocyanate.

The procedures of general applicability discussed above can be used to prepare the following compounds:

1 - (3-trifluoromethylbenzylcarbamyl)-2 - [2-(2,6-di-methyl-1-piperidyl)ethyl]piperidine by reaction of 2-[2-(2,6-dimethyl-1-piperidyl)ethyl]piperidine with 3-triflu-oromethylbenzylisocyanate.

1 - (4 - iodophenylthiocarbamyl)-2-[2-1-pyrrolidyl)-ethyl] - 5-butylpiperidine by reaction of 2-[2-(1-pyrrolidyl)-ethyl]-5-butylpiperidine with 4-iodophenylisothiocyanate.

1 - (2-methoxybenzylcarbamyl)-2-[3 - (1-piperidyl)-propyl]piperidine by reaction of 2-[3-(1-piperidyl)propyl]-piperidine with 2-methoxybenzylisocyanate.

1 - diethylcarbamyl - 2-[2-(2,5 - dimethyl-4-morpholinyl)ethyl]piperidine by reaction of 2[2-(2,5-dimethyl-4-morpholinyl)-ethyl]piperidine with diethylcarbamoyl chloride.

1 - (2-fluorophenylthiocarbamyl) - 3-[6-(1-piperidyl)-hexyl]piperidine by reduction of 3-[6-(1-piperidyl)hexyl]pyridine obtained by reduction of the amide, N,N-pentamethylene-6-(3-pyridyl)hexanamide prepared by the condensation of ethyl 6-(3-pyridyl)hexanoate with piperidine.

1 - benzylcarbamyl - 4-[2-(4-phenyl-1 - piperazinyl)ethyl]-6-methylpiperidine by reaction of 4-[2-(4-phenyl-1-piperazinyl)ethyl]-6-methylpiperidine with benzylisocyanate.

1 - (3,4,5 - trimethoxyphenylthiocarbamyl) - 2-(2-dibutylaminoethyl)piperidine by reaction of 3,4,5-trimethoxyphenylisothiocyanate with 2-(2-dibutylaminoethyl)piperidine.

The compounds of the invention are valuable therapeutic agents for producing a lowering of the blood pressure of mammals and are therefore useful as hypotensive agents. Compounds within the scope of the invention produce a gradual, prolonged lowering of blood pressure in the unanesthetized renal hypertensive rat and the anesthetized dog without the undesirable side effects of sadation and parasympathetic-like effects. Oral toxicity determinations indicate that the compounds, when administered intraveneously in the mouse, have $LD_{50}$'s in the range 50–250 mg./kg. The $LD_{50}$ is defined as the lethal dose for 50% of the animals at that particular dose level. The compounds also have chemotherapeutic properties and are effective, for example, against flagellate protozoa of the genus Trichomonas, and against the nematode worm of the genus Strongylodies.

The compounds of the invention can be formulated for use in the same way as conventional hypotensive agents, such as reserpine preparations, or as conventional trichomonicidal agents, such as aminitrozole. They can be formulated into tablets, syrups, or capsules for oral administration or dissolved under sterile conditions for parenteral injection.

This application is a continuation-in-part of copending application Serial No. 34,876, filed June 9, 1960, and now abandoned.

I claim:
1. A compound having the structural formula

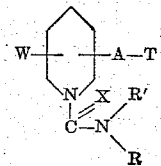

wherein T is a member of the group consisting of di-lower-alkylamino, 1-pyrrolidyl, C-lower-alkylated-1-pyrrolidyl, 1-piperidyl, C-lower-alkylated-1-piperidyl, 4-morpholinyl, C-lower-alkylated-4-morpholinyl, 4-thiomorpholinyl, 1-hexamethyleniminyl, 2-(1,2,3,4-tetrahydroisoquinolyl), 1-decahydroquinolyl, 4-phenyl-1-piperazinyl, 4-lower-alkyl-1-piperazinyl, 4-(2-hydroxyethyl)-1-piperazinyl, anilino and anilino ring-substituted by from one to three members of the group consisting of lower-alkyl and lower-alkoxy, A is lower-alkylene having one to six carbon atoms, X is a member of the group consisting of oxygen and sulfur, R is a member of the group consisting of hydrogen, lower-alkyl and lower-alkenyl, R' is a member of the group consisting of hydrogen, lower-alkyl, lower-alkenyl, phenyl, benzyl and phenyl and benzyl ring-substituted by from one to three members of the group consisting of lower-alkyl, lower-alkoxy, nitro, halogen and trifluoromethyl, and W is a member of the group consisting of hydrogen and lower-alkyl.

2. 1 - (4-chlorophenylthiocarbamyl)-2-[2-(1 - piperidyl)-ethyl]piperidine.
3. 1 - (4 - nitrophenylcarbamyl) - 4 - [2 - (1 - piperidyl)ethyl]-piperidine.
4. 1 (N,N - diethylcarbamyl) - 2 - [2-(4 - phenyl - 1-piperazinyl)ethyl]piperidine.
5. 1 - (4-chlorophenylthiocarbamyl)-2-(2-diethylamino-ethyl)piperidine.
6. 1 - (4-chlorophenylthiocarbamyl)-2[2-(4-morpholinyl) ethyl]-5-ethylpiperidine.
7. 1 - (2-chlorophenylcarbamyl)-2-[2-(2,6-dimethyl-4-morpholinyl)ethyl]piperidine.
8. 1-carbamyl-2-(2-anilinoethyl)piperidine.
9. 1-carbamyl-2-[2-(1-pyrrolidyl)ethyl]piperidine.
10. 1 - (phenylcarbamyl)-2-[2 - (1-pyrrolidyl)ethyl]-piperidine.
11. 1 - (phenylthiocarbamyl)-2-[2-(1 - pyrrolidyl)ethyl]-piperidine.
12. 1 - (4-chlorophenylthiocarbamyl)-2-[2-(1-pyrrolidyl)ethyl]piperidine.
13. 1- (4-chlorophenylthiocarbamyl)-2-[2-(1-pyrrolidyl)ethyl]-5-ethylpiperidine.
14. 1 - (2-chlorophenylthiocarbamyl)-2-[2-(1-pyrrolidyl)ethyl]-5-ethylpiperidine.
15. 1-carbamyl-4-[2-(1-pyrrolidyl)ethyl]piperdine.
16. 1 - carbamyl-2-[2-(1-hexamethyleniminyl)ethyl]-piperidine.
17. 1 - (4-nitrophenylcarbamyl)-2 - [2-(1-hexamethyleniminyl)ethyl]piperidine.
18. 1 - (4-chlorophenylthiocarbamyl) - 2-[2-(1-hexamethyleniminyl)ethyl]piperidine.
19. 1 - (4-chlorophenylthiocarbamyl) - 2-[2-(1-hexamethyleniminyl)ethyl]-5-ethylpiperidine.
20. 1 - (3,4-dichlorophenylthiocarbamyl)-2-[2-(1-hexamethyleniminyl)ethyl]piperidine.
21. 1 - (4-chlorobenzylthiocarbamyl) - 2-[2-(1-hexamethyleniminyl)ethyl]piperidine.
22. 1 - (4-nitrophenylcarbamyl) - 2-[2-(4-methyl-1-piperazinyl)ethyl]piperidine.
23. 1 - (4-chlorophenylcarbamyl) - 2-[ 2-(4-methyl-1-piperazinyl)ethyl]piperidine.
24. 1 - (2-methoxyphenylcarbamyl)-2-[2-(4-methyl-1-piperazinyl)ethyl]piperidine.
25. 1 - (4-chlorophenylthiocarbamyl)-2-[2-(4-methyl-1-piperazinyl)ethyl]piperidine.
26. 1 - n-butylthiocarbamyl-2 - [2-(4-methyl-1-piperazinyl)ethyl]piperidine.
27. 1 - (4-ethoxyphenylthiocarbamyl)-2-[2-(4-methyl-1-piperazinyl)ethyl]piperidine.
28. A compound having the structural formula

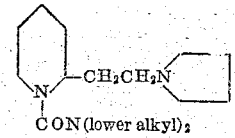

29. 1 - (diethylcarbamyl) - 2-[2-(1-pyrrolidyl)ethyl]-piperidine.
30. 1 - (dimethylcarbamyl)-2-[2-(1-pyrrolidyl)ethyl]-piperidine.

No references cited.

UNITED STATES PATENT OFFICE
CERTIFICATE OF CORRECTION

Patent No. 3,133,061            May 12, 1964

Frederick K. Kirchner

It is hereby certified that error appears in the above numbered patent requiring correction and that the said Letters Patent should read as corrected below.

Column 5, line 36, for "$C_2H_5CNa$" read -- $C_2H_5ONa$ --; column 8, line 14, for "alternation" read -- alteration --; column 16, line 44, for "is" read -- in --; line 60, for "136-148° C." read -- 136-138° C. --; lines 70 and 71, for "1-(4-chlorophenylisocarbamyl)" read -- 1-(4-chlorophenylthiocarbamyl) --; column 17, line 12, for "4-chlorophenylisocyanate" read -- 4-chlorophenylisothiocyanate --; line 55, for "1-allylthiocarbambyl" read -- 1-allylthiocarbamyl --; column 18, line 25, for "8.5" read -- 8.5 g. --; column 21, line 28, for "12.7" read -- 12.7 g. --; column 22, line 14, for "2-[2-1-" read -- 2-[2-(1- --; lines 50 and 51, for (1-hexamethyleniminyl (ethyl] piperidine" read -- (1-hexamethyleniminyl)ethyl]piperidine --; lines 57 and 58, for "(4-methyl-1-piperidyl(ethyl]piperidine" read -- (4-methyl-1-piperidyl)ethyl]piperidine --; column 23, line 6, for "reported" read -- prepared --; column 26, line 74, for "[2-1-pyrrolidyl)" read -- [2-(1-pyrrolidyl) --; column 27, lines 30 to 31, for "sadation" read -- sedation --; column 28, line 13, for "1(N,N" read -- 1-(N,N --; line 17, for "2[2" read -- 2-[2 --.

Signed and sealed this 17th day of November 1964.

(SEAL)
Attest:

ERNEST W. SWIDER                 EDWARD J. BRENNER
Attesting Officer               Commissioner of Patents